US012812400B2

(12) United States Patent
Strasser et al.

(10) Patent No.: US 12,812,400 B2
(45) Date of Patent: Nov. 24, 2026

(54) SYSTEMS AND METHODS FOR LINE-OF-SIGHT EVALUATION IN DRONE NETWORKS

(71) Applicant: General Dynamics Mission Systems, Inc., Fairfax, VA (US)

(72) Inventors: Benjamin A. Strasser, Minneapolis, MN (US); Daniel Andrés Duque, Fairfx, VA (US)

(73) Assignee: GENERAL DYNAMICS MISSION SYSTEMS, INC., Fairfax, VA (US)

( * ) Notice: Subject to any disclaimer, the term of this patent is extended or adjusted under 35 U.S.C. 154(b) by 197 days.

(21) Appl. No.: 18/732,197

(22) Filed: Jun. 3, 2024

(65) Prior Publication Data

US 2025/0321588 A1 Oct. 16, 2025

Related U.S. Application Data

(60) Provisional application No. 63/632,792, filed on Apr. 11, 2024.

(51) Int. Cl.
*H04W 16/18* (2009.01)
*G05D 1/246* (2024.01)
(Continued)

(52) U.S. Cl.
CPC .......... *H04W 16/18* (2013.01); *G05D 1/2462* (2024.01); *G05D 1/622* (2024.01);
(Continued)

(58) Field of Classification Search
CPC . H04W 16/18; H04W 28/0226; H04W 84/18; G05D 1/622; G05D 1/644; G05D 1/2462; G05D 2109/20
(Continued)

(56) References Cited

U.S. PATENT DOCUMENTS 7,421,466 B2 * 9/2008 Haines .................. H04W 99/00 340/995.13
10,586,464 B2 * 3/2020 Dupray .................... G08G 5/26
(Continued)

OTHER PUBLICATIONS

Bloch, A.et al,. 'Modular, Extensible, Interoperable Autonomy: An Autonomy Architecture for the Internet of Military Things and the Future of Warfare' Open Architecture/Open Business Model Net-Centric Systems and Defense Transformation 2023, edited by Raja Suresh, Proc. of SPIE vol. 12544, 125440S •© 2023 SPIE 0277-786X • doi: 10.1117/12.2660255 Proc. of SPIE vol. 12544 125440S-1.
(Continued)

*Primary Examiner* — Yazan A Soofi
(74) *Attorney, Agent, or Firm* — Ingrassia Fisher & Lorenz, LLP

(57) ABSTRACT

Described herein are systems and methods that facilitate the navigation and communication of drones, including autonomous and semi-autonomous drones. These various embodiments facilitate the navigation and communication of such drones by providing for the evaluation of line-of-sight paths, including communication links and navigation paths. For example, the systems and methods can facilitate evaluation of line-of-sight paths for navigation and communication using a spatial obstruction database. In these embodiments the spatial obstruction database can abstract obstructions in a variety of ways, including as defined subregions. As will be described below, these systems and methods are particularly applicable to the navigation and communication of autonomous and semi-autonomous drones that may have limited processing and memory capabilities.

20 Claims, 19 Drawing Sheets

(51) Int. Cl.

| | |
|---|---|
| ***G05D 1/622*** | (2024.01) |
| ***G05D 1/644*** | (2024.01) |
| ***G05D 109/20*** | (2024.01) |
| ***H04W 28/02*** | (2009.01) |
| ***H04W 84/18*** | (2009.01) |

(52) U.S. Cl.
CPC ........ *G05D 1/644* (2024.01); *H04W 28/0226* (2013.01); *H04W 84/18* (2013.01); *G05D 2109/20* (2024.01)

(58) Field of Classification Search
USPC ........................................................ 701/28
See application file for complete search history.

(56) References Cited

U.S. PATENT DOCUMENTS

| | | | | |
|---|---|---|---|---|
| 12,567,206 | B2 * | 3/2026 | Jang | G06T 17/05 |
| 2017/0069214 | A1 * | 3/2017 | Dupray | G08G 5/56 |
| 2020/0233439 | A1 * | 7/2020 | Ivanov | G08G 5/26 |
| 2020/0234601 | A1 * | 7/2020 | Ivanov | G08G 5/57 |
| 2021/0311162 | A1 * | 10/2021 | Mai | G01S 7/415 |

OTHER PUBLICATIONS

Bloch, A. et al., 'The Implementation of Modular, Extensible, Interoperable Autonomy (MEIA) for an ArduCopter-Equipped Drone Executing Various Missions', Open Architecture/Open Business Model Net-Centric Systems and Defense Transformation 2023, edited by Raja Suresh, Proc. of SPIE vol. 12544, 1254404 • © 2023 SPIE 0277-786X • doi: 10.1117/12.2660922Proc. of SPIE vol. 12544 1254404-1.
Liang, Y. et al., 'A New Concept .and Method for Line Clipping', ACM Transactions on Graphics, Jan. 1984, vol. 3, No. 1, pp. 1-22.
Salomon, B. et al., 'Accelerating Line of Sight Computation Using Graphics Processing Units', ADM001736, Proceedings for the Army Science Conference (24th) Held on Nov. 29-Dec. 2, 2005 in Orlando, Florida.
Dolev, S. et al., 'Autonomous Virtual Mobile Nodes', Computer Science and Artificial Intelligence Laboratory Technical Report MIT-CSAIL-TR-2005-043, MIT-LCS-TR-992 Jun. 15, 2005.
Patracek, P. et al., 'Bio-Inspired Compact Swarms of Unmanned Aerial Vehicles without Communication and External Localization', Department of Cybernetics, Faculty of Electrical Engineering, Czech Technical University in Prague, 166 36, Prague 6, Czech Republic Aug. 2020.
Khan, A. et al., 'Bio Inspired Source Seeking: a Hybrid Speeding Up and Slowing Down Algorithm*', 2016 IEEE 55th Conference on Decision and Control (CDC) Aria Resort & Casino Dec. 12-14, 2016, Las Vegas, USA.
Duque, A. et al., 'Drone-Hosted Autonomous Radio Mesh Activity (DHARMA)' Open Architecture/Open Business Model Net-Centric Systems and Defense Transformation 2023, edited by Raja Suresh, Proc. of SPIE vol. 12544, © 2023 SPIE0277-786X • doi: 10.1117/12.2662751 proc. of SPIE vol. 12544.
Duque, A. et al., 'Drone-Hosted Autonomous Radio Mesh Activity—BioLogical Inspired Swarming at Scale (Dharma-Bliss)' Unmanned Systems Technology XXVI Jun. 2024.
Bresenham, J.E., 'Algorithm for computer control of a digital plotter' IBM Systems Journal • vol. 4 · No. 1 • 1965.
Cortes, J. et al., 'Coordinated Control of Multi-Robot Systems: A Survey', SICE Journal of Control, Measurement, and System Integration, vol. 10, No. 6, pp. 001-009, Nov. 2017.
Davoli, L. et al., 'Hybrid LoRa-IEEE 802.11s Opportunistic Mesh Networking for Flexible UAV Swarming'—IEEE 802.11s Opportunistic Mesh Networking for Flexible UAV Swarming. Drones Apr. 15, 2021, 2021.
Santos, M. et al., 'Coverage Control for Multi-Robot Teams with Heterogeneous Sensing Capabilities Using Limited Communications*', IEEE/RSJ International Conference on Intelligent Robots and Systems (IROS) Madrid, Spain, Oct. 1-5, 2018.
Moller T. et al., 'Fast, Minimum Storage Ray/Triangle Intersection', SIGGRAPH '05: ACM SIGGRAPH 2005 Courses Jul. 31, 2005.
Reynolds, c., 'Flocks, Herds, and Schools: A Distributed Behavioral Model', Computer Graphics, vol. 21, No. 4, Jul. 1987.
Luders, B. et al., 'Robust Sampling-based Motion Planning with Asymptotic Optimality Guarantees', AIAA Guidance, Navigation, and Control (GNC) Conference. American Institute of Aeronautics and Astronautics, 2013.
Abouzaid, L. et al., 'The Meshing of the Sky: Delivering Ubiquitous Connectivity to Ground Internet of Things', IEEE Internet of Things Journal, vol. 8 No. 5 Mar. 1, 2021.
Arge, L. et al., 'The Priority R-Tree: A Practically Efficient and Worst-Case Optimal R-Tree', ACM Transactions on Algorithms (TALG), vol. 4, Issue 1Article No. 9, pp. 1-30.
Usevitch, J. et al., 'Resilient Trajectory Propagation in Multirobot Networks', IEEE Transactions on Robotics, vol. 38 No. 1, Feb. 2022.
Kala, R.K., 'Rapidly-exploring Random Graphs: Motion Planning of Multiple Mobile Robots', ResearchGate Oct. 2013.
Steinbrink, M. et al., 'Rapidly-Exploring Random Graph Next-Best View Exploration for Ground Vehicles' , IEEE 2021.
Lavalle, S.M., 'Rapidly-Exploring Random Trees: A New Tool for Path Planning', Computer Science, Engineering Published 1998.
Karaman, S. et al., 'Sampling-based Algorithms for Optimal Motion Planning' Computer Science, Robotics, May 5,2011.
SPanos, D.P. et al., 'Robust Connectivity of Networked Vehicles', 43rd IEEE Conference on Decision and Control Dec. 14-17, 2004.
Kleider, J.E. et al., 'Open- and Closed-loop Distributed Beamforming', Open Architecture/Open Business Model Net-Centric Systems and Defense Transformation 2021, edited by Raja Suresh, Proc. of SPIE vol. 11753, 117530D • © 2021 SPIE.
Santos, M. et al., 'Decentralized Minimum-Energy Coverage Control for Time-Varying Density Functions',2019 International Symposium on Multi-Robot and Multi-Agent Systems (MRS) Rutgers University, New Brunswick, NJ, USA. Aug. 22-23, 2019 IEEE 2019.
Tao, Y. et al., 'The TPR *-Tree: An Optimized Spatio-Temporal Access Method for Predictive Queries', Proceedings of the 29th VLDB Conference, Berlin, Germany, pp. 790-801, 2003.

* cited by examiner

SYSTEMS AND METHODS FOR LINE-OF-SIGHT EVALUATION IN DRONE NETWORKS

CROSS-REFERENCE TO RELATED APPLICATIONS

This application claims the benefit of U.S. Provisional Application No. 63/632,792, filed on Apr. 11, 2024. The disclosure of the above application is incorporated herein by reference.

TECHNICAL FIELD

The present invention generally relates to drones, and more particularly relates to systems and methods for navigation and communication of drones and drone networks.

BACKGROUND

Drones are used for a variety of applications in modern society. In general, drones are unmanned vehicles, and are implemented with a variety of propulsion systems and power systems. As main examples, drones can be implemented as both fixed wing and rotary unmanned aerial vehicles (UAVs).

One issue with the use of drones today is navigation. Specifically, providing for the navigation of drones in complex environments can be exceedingly difficult and unreliable. This is especially true for drones where autonomous or semi-autonomous navigation is desired.

Another issue is maintaining communication between drones. Specifically, providing for communication between drones and between drones and other elements in complex environments can be exceedingly difficult and unreliable. This is again especially true for drones where autonomous or semi-autonomous navigation is desired.

These issues are especially problematic in areas with limited infrastructure. For example, it can be very difficult to navigate drones in areas where data communication is limited. For example, in underserved environments (e.g., restricted environments or remote environments) during times of natural and man-made disasters, conflicts, or other such situations can be critical in providing effective responses to such situations. Specifically, during a natural disaster local internet and other communication links may be unreliable, degraded or fully inoperable.

Hence, there is an ongoing need for improved drone navigation and communication systems and methods, especially systems and methods that can effectively provide drones with the ability navigate and communicate with high degrees of autonomy in a variety of restricted environments. Furthermore, other desirable features and characteristics of the present invention will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

The various embodiments described herein provide systems and methods that facilitate the facilitate the navigation and communication of drones, including autonomous and semi-autonomous drones. These various embodiments facilitate the navigation and communication of such drones by providing for the evaluation of line-of-sight paths, including communication links and navigation paths. As will be described in greater detail below, these systems and methods are particularly applicable to the communication and navigation of drones in restricted environments.

In one embodiment, a system comprises a spatial obstruction database for a geographic region, where the spatial obstruction database represents physical features in the geographic region as abstracted spatial obstructions within the spatial obstruction database; at least one processor configured to: identify a potential path in the geographic region, where the potential path is defined between plurality of positions within the geographic region, and for the potential path: query the spatial obstructions database for a volume that contains the potential path and return abstracted spatial obstructions from the spatial obstruction database that correspond to the volume; determine if any of the returned abstracted spatial obstructions for the volume intersect with the potential path to determine if the potential path is unobstructed.

In another embodiment, a method is provided, comprising: providing a spatial obstruction database for a geographic region, where the spatial obstruction database represents physical features in the geographic region as abstracted spatial obstructions within the spatial obstruction database; and identifying the potential path in a geographic region, where the potential path is defined between plurality of positions within a geographic region, and for the potential path: querying the spatial obstructions database for a volume that contains the potential path and return abstracted spatial obstructions from the spatial obstruction database that correspond to the volume; determining if any of the returned abstracted spatial obstructions for the volume intersect with the potential path to determine if the potential path is unobstructed.

Furthermore, other desirable features and characteristics of the system and methods will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

The various embodiments described herein provide systems and methods that facilitate the navigation and communication of drones, including autonomous and semi-autonomous drones. These various embodiments facilitate the navigation and communication of such drones by providing for the evaluation of line-of-sight paths, including communication links and navigation paths. As will be described in greater detail below, these systems and methods are particularly applicable to the use of drones in underserved environments.

For example, the systems and methods can facilitate evaluation of line-of-sight paths for navigation and communication using a spatial obstruction database. In these embodiments the spatial obstruction database can abstract obstructions in a variety of ways, including as defined subregions. As will be described below, these systems and methods are particularly applicable to the navigation and communication of autonomous and semi-autonomous drones that may have limited processing and memory capabilities. Finally, the systems and methods can facilitate communication networks that can provide high-bandwidth communication using direct line-of-sight communication between autonomous and semi-autonomous drones.

Figure 1:
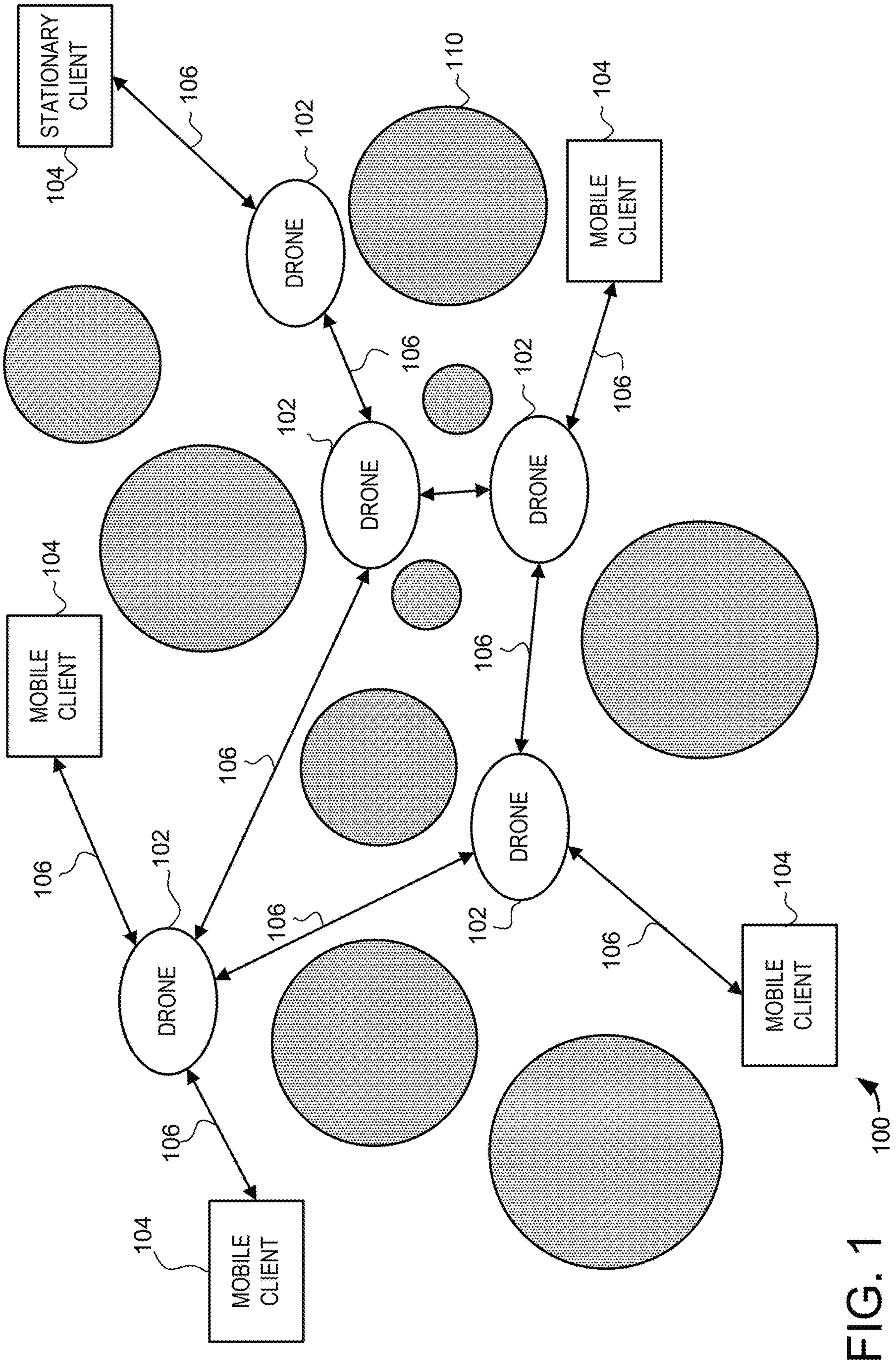
FIG. 1 is a schematic diagram illustrating an exemplary drone-hosted communication network in accordance with various embodiments.

Turning now to FIG. 1, an example of a drone-hosted communication network 100 is illustrated schematically. The drone-hosted communication network 100 is an example of the type of communication network that can be facilitated using the systems and methods described herein. In this example, the drone-hosted communication network 100 includes a plurality of drones 102 and it provides data communication to and between a plurality of clients 104, including mobile clients and a stationary client. Inter-dispersed between the various drones 102 and clients 104 are a plurality of obstructions 110. These obstructions 110 represent any type of structure or feature that can interfere with communication. Thus, the obstructions 110 can thus include structures (e.g., buildings, bridges, dams), electromagnetic and other types of interference (e.g., jamming signals), geographic features (e.g., hills, cliffs), restricted areas or any other type of structure of feature that could interfere with communication between drones 102 or between drones 102 and clients 104, or interfere with movement of drones 102 independent of communications considerations.

When implemented, the drone-hosted communication network 100 provides a plurality of communication links 106 between drones 102 and between drones 102 and clients 104. In general, these communication links 106 are implemented to provide two-way data communication between drones 102 and between drones 102 and clients 104. Notably, the configuration of the drone-hosted communication network 100 (e.g., the position of the drones 102 and the establishment of the communication links 106) is such that the communication links 106 avoid the obstructions 110. As will be described in greater detail below, in some embodiments the communication links 106 are implemented to provide high-bandwidth line-of-sight (LOS) data communication between drones 102 and clients 104 while avoiding the obstructions 110.

It should be noted that the drone-hosted communication network 100 is a very simplified example, and that in real-world applications such a drone-hosted communication network 100 could include many more elements (including more drones 102 and clients 104) and provide a large coverage area (that includes more obstructions 110). Thus, such a drone-hosted communication network 100 can be implemented as a large and complex mesh network to provide a much larger coverage area, where the larger coverage area includes many more obstructions 110 to be avoided. Such a drone-hosted communications network 100 can feature multiple types of obstructions, including obstructions which block movement but not communications and obstructions which block communications but not movement. In such embodiments, the communications links 106 will avoid signal-occluding obstructions, and any drone movement will avoid movement-restricting obstructions.

In general, the drones 102 can be implemented with any suitable type of unmanned vehicle (UV). Specifically, the drones 102 can be implemented with a variety of propulsion and power systems. As one specific example, the drones 102 can be implemented with both fixed wing and rotary unmanned aerial vehicles (UAVs).

To facilitate the creation of the drone-hosted communication network 100, the drones 102 are implemented to include suitable communication devices. Thus, the drones 102 would typically include the combination of antennas, transmitters, receivers, hardware and/or software needed to provide the communication links 106. As examples, the drones 102 can be implemented to include communication devices for line-of-sight (LOS) communication using radio (e.g., 5G, directed RF) or optical signals that can provide relatively high-bandwidth communication.

One or more of the drones 102 can be implemented with any suitable combination of processor and data storage suitable to implement the various systems and methods described herein. For example, the drones can include any custom made or commercially available processor, including a central processing unit (CPUs), an auxiliary processor among several processors associated with the drone, microprocessor, macroprocessor, or any combination thereof, or generally any computing device for executing instructions. The drones can likewise include any data storage, including volatile and nonvolatile storage in read-only memory (ROM), random-access memory (RAM), and keep-alive memory (KAM). The data storage can further include devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions.

The clients 104 can include any type of suitable communication device for which the drone-hosted communication network 100 is implemented to provide network connectivity. These clients 104 can include mobile clients (e.g., clients associated with vehicles or persons) and stationary clients (e.g., clients associated with fixed locations).

Figure 2A:
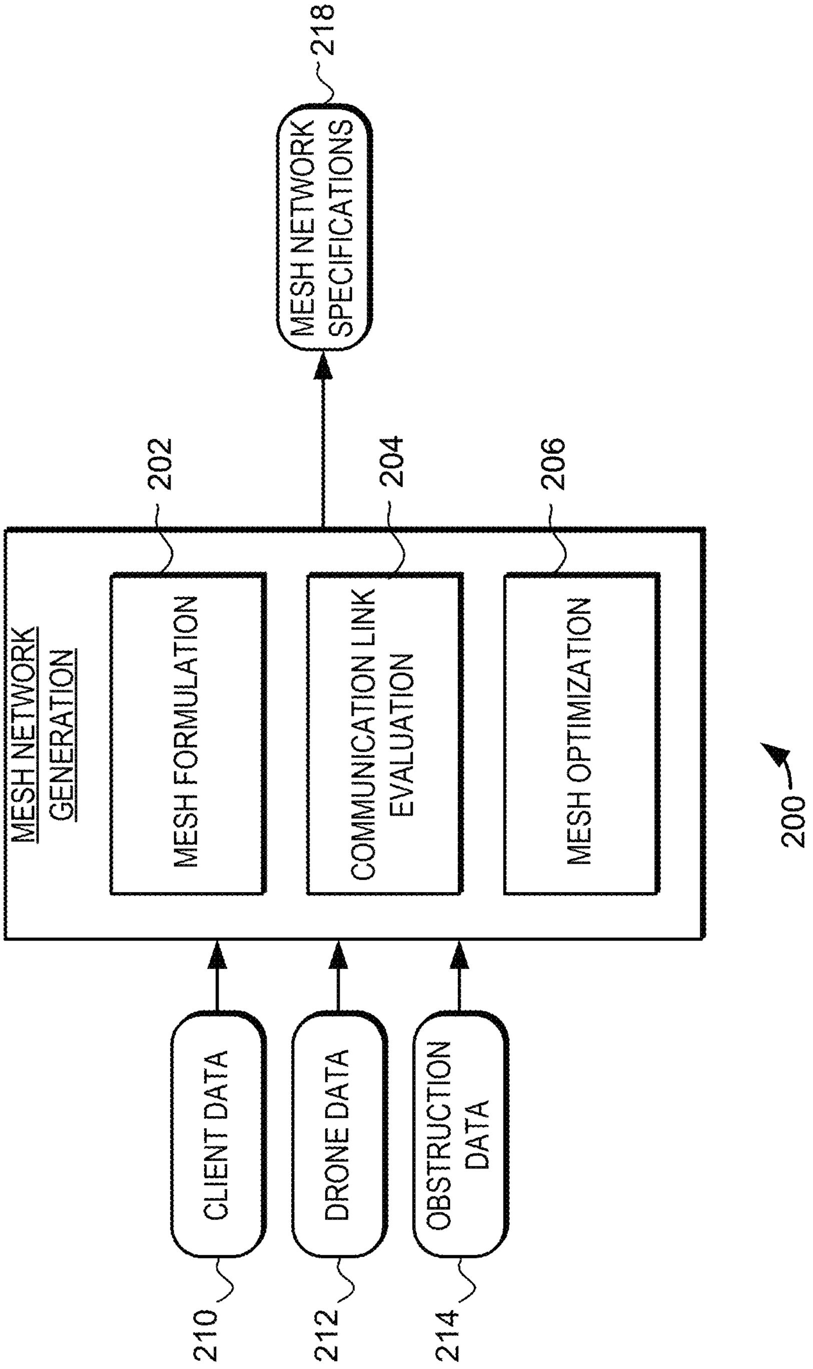
FIG. 2A is a schematic diagram illustrating an exemplary mesh network generation system in accordance with various embodiments.

Turning now to FIG. 2A, a schematic view of a mesh network generation system 200 is illustrated. In general, the mesh network generation system 200 is an example of the type of system that can be implemented to generate drone-hosted communication networks (e.g., drone-hosted communication network 100 of FIG. 1) in accordance with the various embodiments described herein. As such, the mesh network generation system 200 can be implemented to facilitate the generation and optimization of a drone-hosted communication network in a way that provides for high reliability in a variety of restricted environments. Furthermore, in some embodiments, the mesh network generation system 200 can be implemented to be executed on one or more of the drones (e.g., drones 102 of FIG. 1) in the network. So implemented, the mesh network generation system 200 can provide for autonomous or semi-autonomous design and optimization of the drone-hosted communication network by at least one of the drones themselves.

In other embodiments the various components and functionality of the mesh network generation system 200 can be distributed throughout the network. Thus, some components may be implemented on one or more drones, while other components are implemented on other devices or systems that are connected to the network.

In the example of the FIG. 2A, the mesh network generation system 200 includes a mesh formulation module 202, a communication link evaluation module 204, and a mesh optimization module 206. Also, in this example, the mesh network generation system 200 uses client data 210, drone data 212, and obstruction data 214.

In general, this client data 210 can include any needed data regarding clients that are to be served by the drone-hosted communication network, including client identifications, specifications and locations. The drone data 212 can likewise include any needed data regarding the drones that are being used to implement the drone-hosted communication network, including drone specifications, drone statues, and drone identification parameters. The obstruction data 214 can likewise include any needed data regarding structures and features that can interfere with communication links and the movement of drones. As such, this obstruction data 214 can include data on structures and features (e.g., buildings, terrain, electromagnetic or other interference) and data on restricted areas (e.g., areas with restricted airspace or other no-go areas). As will be described in greater detail below, this obstruction data 214 can be provided in the form of spatial obstruction database that facilitates specific query techniques to quickly access the data in a way that reduces the required computational resources. For example, the obstruction data 214 can be provided in the form of a spatial obstruction database that is optimized for three dimensional queries. As another example, the obstruction data 214 can be provided in the form of a spatial obstruction database that represents physical features in a geographic region as abstracted spatial obstructions. In such an embodiment the abstracted spatial obstructions can represent geographic regions as a plurality of subregions, where for each of the plurality of subregions that includes an obstruction, the subregion is identified as obstructed to an obstructed high point.

In general, the mesh network generation system 200 uses these various modules and data types to generate and optimize a specific drone-hosted communication network that will provide the needed network connectivity to one or more clients over a designated coverage area. This generation and optimization includes the selection and modification of specific drone positions and network links for each drone within the network, where the final drone positions and network links are optimized to provide high network reliability. The specification of the final generated network can be outputted and transmitted to the other drones in the network as mesh network specifications 218. These mesh network specifications 218 can include the final position of each drone to establish the network, the connection links between drones (including between drones and clients) in the network. The mesh network specifications 218 can also include any needed information regarding clients served by the network, and any other information used by the drones in establishing and maintaining the network. Again, generating the mesh network specifications 218 on a drone in the network and then transmitting the specifications as needed to other drones in the network can provide for autonomous or semi-autonomous design and optimization of the drone-hosted communication network by the drones themselves.

In general, the mesh formulation module 202 is implemented to select candidate drone positions and network links. As will be described in greater detail below, the mesh formulation module 202 can be implemented to utilize a directed search in selecting candidate drone positions and network links. In specific embodiments, the mesh formulation module 202 is implemented to use a randomized spatial exploration technique, such as a Rapidly-Exploring Random Graph (RRG) exploration technique.

In general, the communication link evaluation module 204 is implemented to evaluate candidate network links for line-of-sight obstruction that can interfere with line-of-sight communication. As will be described in greater detail below, the communication link evaluation module 204 can be implemented to utilize a spatial obstruction database in evaluating candidate network links for line-of-sight obstruction. As will be described in greater detail below, such a spatial obstruction database can be optimized for three dimensional queries. Furthermore, the spatial obstruction database can include abstracted spatial obstructions in the form of subregions that are identified as fully obstructed.

In general, the mesh optimization module 206 is implemented to select final drone positions and network links for inclusion into the network. This selection of final drone positions and network links optimizes the network to provide high network reliability. A variety of different techniques can be used to perform these optimizations, including the generation of link scores and network scores. Additionally, iterative techniques can be used to perform this optimization.

For example, the mesh optimization module 206 can be implemented to perform this optimization by generating a link score for each candidate communication link, and then using these link scores to select communication links. Such a link score can be generated based at least in part on a measure of available drone movement before disconnection. As another example, the link score can be generated based at least in part on a measure of drone displacement that can occur before a communication path for the communication link becomes obstructed. As another example, the link score can be generated based at least in part on a measure of link criticality within the network context.

In other embodiments, the mesh optimization module 206 can be implemented to perform this optimization by generating network scores for possible network configurations. In such embodiments the network scores may be based at least in part on link scores of links the network. As another example, the network score can be generated based at least in part on a measure of spatial coverage for each of the plurality of possible network configurations. As another example, the network score can be generated based at least in part on a measure of link redundancy for each of the plurality of possible network configurations. As another example, the network score can be generated based at least in part on a measure of node redundancy for each of the plurality of possible network configurations. As another example, the network score can be generated based at least in part on a measure of connectivity for each of the plurality of possible network configurations.

In other embodiments, the network score can be generated based at least in part on a weighted sum of measures of algebraic connectivity for each of the plurality of possible network configurations. In these embodiments the possible network configurations may be generated by the mesh formulation module 202 or derived from those network configurations. In this embodiment, the measures of algebraic connectivity for each of the plurality of possible network configurations can be determined using at least one eigenvalue a Laplacian matrix for each of the plurality of possible network configurations, where the at least one Laplacian matrix is based on a graph model of the corresponding possible network configuration and includes matrix coefficients derived from link scores for corresponding communication links of the plurality of possible communication links.

In other embodiments, the mesh optimization module 206 can be implemented to perform this optimization using an iterative process. These iterative processes can use the link scores and/or network scores described above to iteratively evaluate possible network configurations.

As one specific example, the mesh optimization module 206 can be implemented to perform this optimization using a genetic algorithm. In these embodiments the mesh optimization module would typically start with one or more network configurations generated by the mesh formulation module 202 or derived from those network configurations. In such an embodiment, the mesh optimization module 206 can be implemented to perform this optimization by repeatedly selecting parent network configurations from the possible network configurations in the network configuration based at least in part on a network score of the parent network configuration, generating children network configurations of the selected parent network configuration, performing perform mutations of the children network configuration, and selecting mutation of children network configuration with a highest network score. In such an embodiment the mutations of the children network configuration can be biased to likely improve the network score of the mutation. Examples of such an embodiment will be discussed with reference to FIG. 5 below.

Figure 2B:
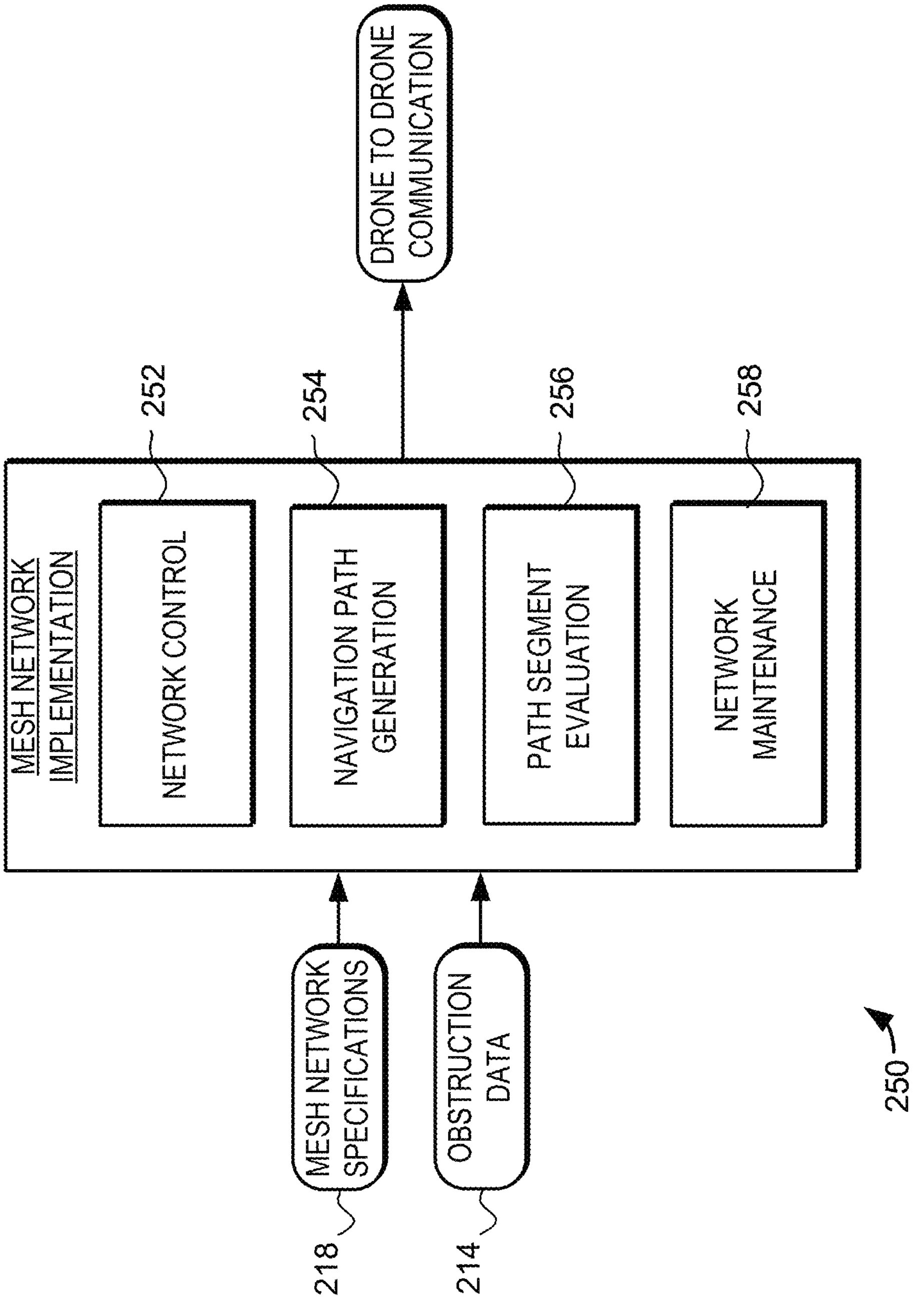
FIG. 2B is a schematic diagram illustrating an exemplary mesh network implementation system in accordance with various embodiments.

Turning now to FIG. 2B, a schematic view of a mesh network implementation system 250 is illustrated. In general, the mesh network implementation system 250 is an example of the type of system that can be implemented to generate drone-hosted communication networks (e.g., drone-hosted communication network 100 of FIG. 1) in accordance with the various embodiments described herein. The mesh network implementation system 250 can be implemented on each of the drones (e.g., drones 102 of FIG. 1) used to provide the network. So implemented, the mesh network implementation system 250 can provide for autonomous or semi-autonomous implementation of the drone-hosted communication network by the drones themselves.

It should be noted that in some embodiments the various components and functionality of the mesh network implementation system 250 can be distributed throughout the network. Thus, some components may be implemented on one or more drones, while other components are implemented on other devices or systems that are connected to the network.

In the example of the FIG. 2B, the mesh network implementation system 250 includes a network control module 252, a navigation path generation module 254, a path segment evaluation module 256, and a network maintenance module 258. Also, in this example, the mesh network implementation system 250 utilizes mesh network specifications 218 and obstruction data 214. As described above, these mesh network specifications 218 can be generated by the mesh network generation system 200 (of FIG. 2A) and can include the position of each drone to establish the network, the connection links between drones (including between drones and clients) in the network. The mesh network specifications 218 can also include any needed information regarding clients served by the network, and any other information used by the drones in establishing and maintaining the network. And again, the obstruction data 214 can include any needed data regarding structures and features that can interfere with communication links and the movement of drones, and can thus include data on buildings, terrain, electromagnetic interference, restricted areas, etc. And again, and as will be described in greater detail below, this obstruction data 214 can be provided in the form of spatial obstruction database that facilitates specific query techniques.

As stated above, the mesh network implementation system 250 can be implemented on each drone. And on each drone the mesh network implementation system 250 uses the various modules to implement and maintain the drone-hosted communication network. This can include the navigation of drones to designated positions, the establishment of communication links between drones. Additionally, this can include responding to changes in network status in a way that maintains or improves network connectivity.

In general, the network control module 252 is implemented to perform general actions to control the drones and establish network connections. This can include initiating drone navigation to assigned positions to establish the network and initiating the establishment of communication links between other drones and/or clients. This can also include other actions such monitoring for changes in drone status, changes in drone positions, changes in communication link status, changes in network status, etc.

In general, the navigation path generation module 254 is implemented to generate navigation paths for drones to follow. As such, the navigation path generation module 254 can be used to guide drones to assigned positions in the drone-hosted mesh network.

The path segment evaluation module 256 is implemented to determine if candidate path segments in a possible navigation path are unobstructed for navigation. As will be described in greater detail below, the path segment evaluation module 256 can be implemented to utilize obstruction data 214 in a spatial obstruction database in evaluating candidate path segments for obstruction.

The network maintenance module 258 is implemented to perform a variety of actions to maintain the health of the drone-hosted mesh network. In one embodiment, these actions can include initiating the adjustment of selected drone positions in response to changes in one or more client positions. In another embodiment, these actions can include initiating the adjustment of selected drone positions in response to changes in an operational status of one or more drones. In another embodiment, these actions can include initiating the adjustment of selected drone positions to improve a link score of a corresponding communication link.

For example, if a client moves or the operational status of a drone changes the network maintenance module 258 can initiate the formulation of a new network configuration. And the network maintenance module 258 can further initiate the movement of one or more drones to implement the new network configuration. In these actions the network maintenance module 258 can initiate the use of the various methods described below for formulating and optimizing network configurations, generating navigation paths, and evaluating links and paths for obstruction.

As was described above with reference to FIGS. 2A and 2B, the mesh network formulation module 202 and navigation path generation module 250 both utilize obstruction data 214. And as was described above, this obstruction data 214 can be provided in the form of a spatial obstruction database. Because this spatial obstruction database can be stored and used on one or more of the drones used to implement the drone-hosted mesh networks, and because such drones may have limited power and computational resources, it can be important to reduce the computational resources required to store and use the spatial obstruction database.

As was described above, this obstruction data stored in the spatial obstruction database can include data on obstructions resulting from structures and features (e.g., buildings, terrain, electromagnetic interference). In one embodiment, the spatial obstruction database is optimized for three dimensional queries in a way that also conserves the required computational resources. The spatial obstruction database can be configured to allow queries based on obstruction type or category. For example, the spatial obstruction database can be configured to allow queries based on ability to communicate between two points in space (e.g., avoiding buildings, terrain, and electromatic interference). For example, the spatial obstruction database can be configured to allow queries based on ability to maneuver between two points in space (e.g., avoiding buildings, terrain, and restricted airspaces).

The spatial obstruction database can be generated in part by taking high resolution spatial data and abstracting the data. For example, a LIDAR scan of a geographic area can provide a high-resolution 3D representation of all physical features in geographic area. Such a high-resolution 3D representation can then be abstracted to reduce the size and complexity of the data when stored in the spatial obstruction database. Abstracting the data in the spatial obstruction database can thus conserve computational resources, including the memory needed on the drones to store and access the database.

Specifically, the spatial obstruction database can be implemented such that obstructions resulting from physical and other features are abstracted to larger three-dimensional (3D) subregions that contain the obstructions, where the entire 3D subregion is then identified as obstructed in the database. As an example, obstructions can be abstracted to 3D subregions having a defined footprint area and a specified altitude. As more specific examples, these obstructions can be abstracted to 3D subregions in the form of larger parallelepipeds such as cuboids.

For example, the buildings and/or trees can be abstracted to a 3D subregion having an altitude that is at least equal to the tallest portion any building or tree within the footprint area of the 3D subregion. Thus, buildings, trees, and other obstruction creating features are abstracted into 3D subregions, where the 3D subregion has an altitude equal to the tallest point of any building, tree or feature in the footprint area. In such embodiments the 3D subregion can be abstracted from the lowest elevation to the altitude of the highest obstructed point in the 3D subregion. In other embodiments the 3D subregion can be abstracted from the altitude of lowest obstructed point in the subregion to the altitude of the highest obstructed point in the 3D subregion.

As one specific example of an abstracted spatial obstruction database, each 3D subregion could have a rectangular footprint, with the height of each subregion at least equal to the height of the highest obstructed point in that footprint. In this embodiment each subregion is cuboid, again with the altitude at least equal to the height of the highest obstructed point in rectangular footprint. And in this embodiment the rectangular footprints can have different sizes to efficiently represent the abstracted obstructions in the spatial obstruction database.

Such an abstracted spatial obstruction database can provide obstruction data while significantly reducing the computational resources needed to store and/or access the database. This reduction of resources can be especially significant where the spatial obstruction database is stored on one or more of the drones used to implement the drone-hosted mesh networks, as such drones may have limited computational resources and power conservation is of great importance.

As described above, in one embodiment the spatial obstruction database is optimized for three dimensional queries. As a specific example, the spatial obstruction database can be implemented as an R-tree data structure, including three-dimensional Priority R-tree data structures. R-tree data structures allow for the representation of obstructions as varying sized cubes and parallelepipeds. Again, allowing for different sized cubes and parallelepipeds can provide for efficient representation of abstracted obstructions. Furthermore, R-tree data structures facilitate the representation of homogeneous obstructions as a single large block, further providing for efficient representation and improving process time. Finally, R-tree data structures can be used to allow for the updates to the spatial obstruction database as new data is provided (e.g., from real time onboard LIDAR sensors on drones).

Figure 3:
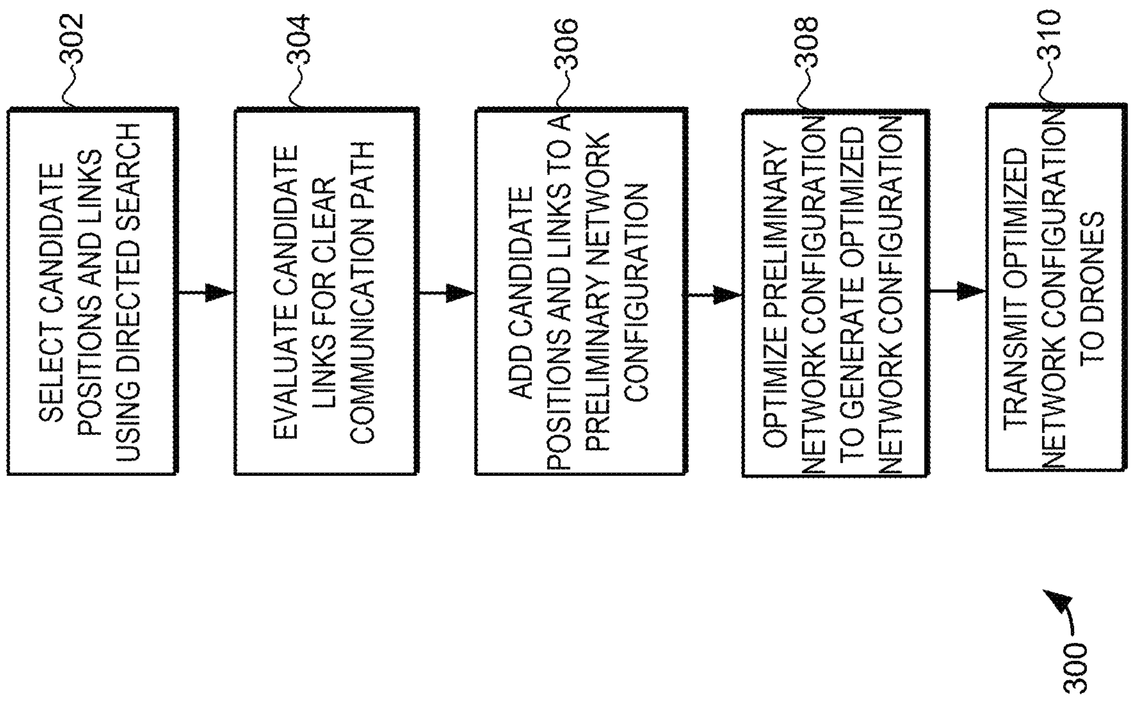
FIG. 3 is a flow diagram illustrating a method of generating a drone-hosted mesh network in accordance with various embodiments.

Turning now to FIG. 3, a flow diagram illustrates a method 300 for generating a drone-hosted mesh network (e.g., drone-hosted communication network 100 of FIG. 1). As such, the method 300 is an example of a method that can be performed by a mesh network generation system 200, and more specifically, the mesh formulation module 202, communication link evaluation module 204, and mesh optimization module 206 of FIG. 2A. In general, the method 300 determines the drone positions and connections for a specific drone-hosted communication network that will provide the needed network connectivity to one or more clients over a designated geographic area. As will be described below, the method 300 utilizes a method 400 (of FIG. 4) for optimizing the drone-hosted mesh network and a method 500 (of FIG. 5) for evaluating communication links.

At step 302 the method 300 selects candidate positions and associated communication links for a drone-hosted mesh network using a directed a search. In this step 302 the candidate positions are possible drone positions that are to be evaluated for inclusion into a preliminary network configuration of a drone-hosted mesh network. As examples, these drone positions can be expressed as three-dimensional positions in the form of latitude, longitude, altitude (LLA) or Northing value, Easting value, down (NED).

In a typical embodiment step 302 begins with one or more selected starting points in a geographic area for which the drone-hosted mesh network is to be provided. Candidate drone positions and associated links are then selected using a directed search of the geographic area. These selected starting points can include the known location of fixed and mobile clients and the last known locations of other mobile clients that are currently disconnected. In specific embodiments, step 302 is implemented to use a randomized spatial exploration technique, such as a Rapidly-Exploring Random Graph (RRG) exploration technique. Such a spatial exploration technique quickly and efficiently can select new candidate drone locations and associated communication links for inclusion into a preliminary network configuration.

More specifically, the RRG exploration technique can be used to generate preliminary network configuration(s) with a high probability of being connected. Specifically, such an RRG exploration technique can be used to repeatedly identify candidate drone positions as distinct subgraph components. As examples, these candidate drone positions can be expressed as three-dimensional positions in the form of latitude, longitude, altitude (LLA) or Northing value, Easting value, down (NED). In identifying these candidate drone positions the RRG technique can select a subgraph component to expand from, select a subgraph component to expand towards, and select a candidate drone position expanding the first subgraph component towards the second using heuristically biased randomized process. The technique can then evaluate the validity of the chosen drone position by determining if the selected position lies in an obstacle, obstructed area, or restricted airspace, or if the chosen point is obstructed from communicating with one or more identified subgraph components. If the candidate drone position is not valid, a new drone position is selected using the same randomized process.

If a new candidate drone position cannot be found after a set number of attempts, the RRG technique selects different subgraphs and repeats the process. After identifying a new candidate drone position, the RRG technique then determines which, if any, subgraph components have been merged, and merges them within the internally maintained subgraph database. The process repeats till all drones have been placed or the network is fully connected (i.e. reduced to one connected subgraph component). If drones remain unplaced, they are placed to improve network coverage and connectivity using a similar heuristically biased randomized process.

At step 304 the associated communication links are evaluated to determine if the associated communication links have a clear line-of-sight path. Specifically, step 304 determines if an associated communication link with a drone at the candidate drone position is subject to the presence of obstruction(s) in the light-of-sight communication path that would potentially interfere with line-of-sight communication with a drone at the candidate position. Specific exemplary techniques for evaluating the line-of-sight of communication links will be discussed below with reference to method 500 and FIG. 5.

The communication links can also be evaluated to determine if their distance is within a specified range. Candidate drone positions with communication links that are too far to be reliable (or too close to be useful) can thus be rejected.

At step 306 the candidate positions and associated links that are determined to have a clear line-of-sight and are within the specified range are added to a candidate network configuration. Candidate positions and associated links that are determined to not have a clear line-of-sight communication path or are not within a specified range are not added to a candidate network configuration. Thus, steps 302 to 306 use a directed search of candidate drone positions and a line-of-sight evaluation to formulate a preliminary network configuration.

Figure 6A:
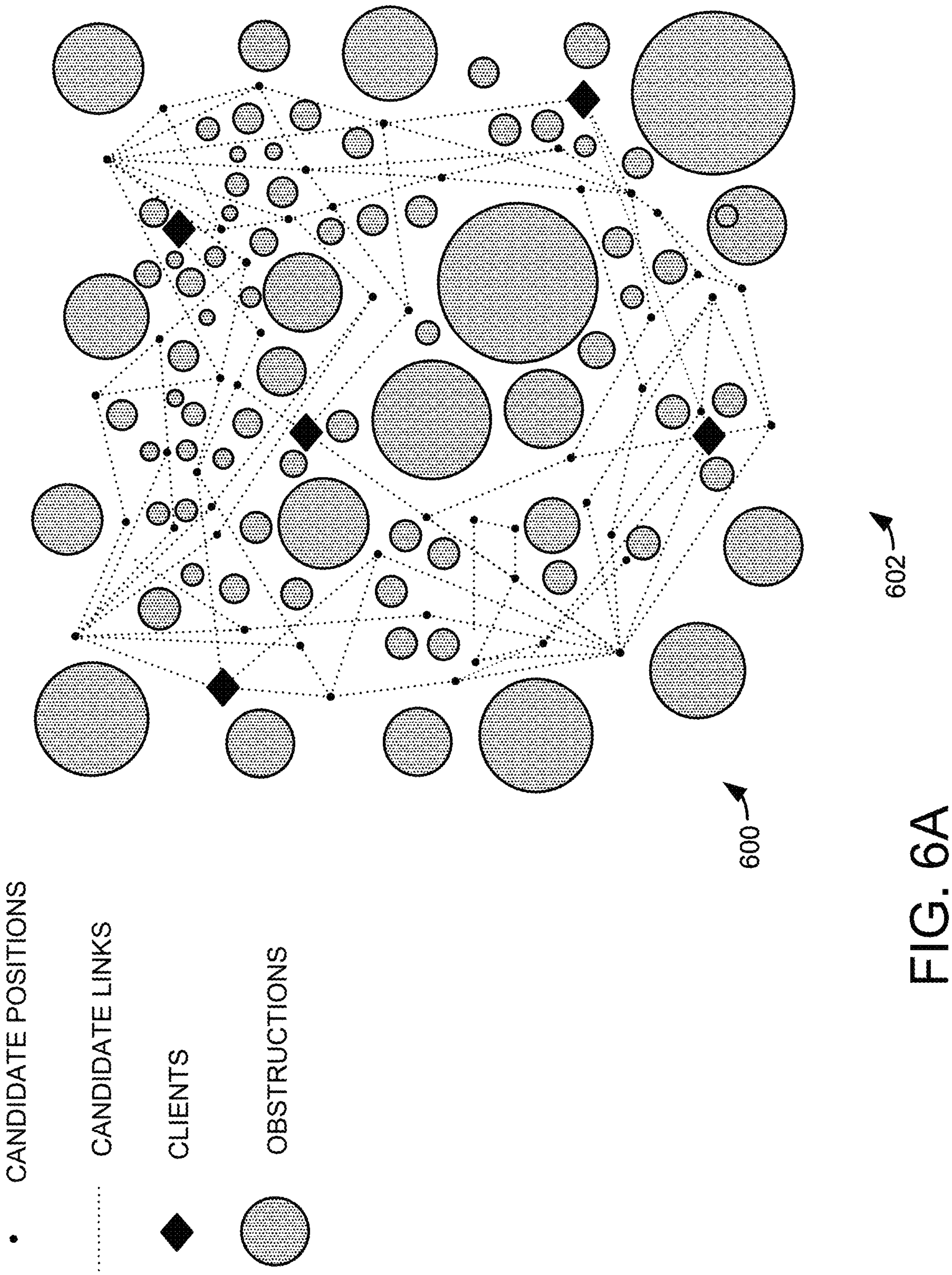
FIGS. 6A and 6B are schematic diagrams of generation of a network configuration in accordance with various embodiments.

Turning briefly to FIG. 6A, an example of a preliminary network configuration 600 is illustrated schematically. The preliminary network configuration 600 is an example network configuration that can be formulated using steps 302-306 of method 300 as described above. As such, the preliminary network configuration 600 defines a plurality of candidate drone positions and candidate communication links. This preliminary network configuration 600 is illustrated in the context of a plurality of clients that are interspersed with a plurality of obstructions in a geographic area 602.

Again, it should be noted that the preliminary network configuration 600 is a relatively simple example, and that real world preliminary network configurations could commonly include thousands of candidate drone positions and candidate communication links. Next it should be noted that such a large preliminary network configuration 600 can be used to generate many possible network configurations, where each possible network configuration describes a fully connected network. For example, in some embodiments dozens or even hundreds of possible network configurations can be derived from the thousands of candidate drone positions and candidate communication links in the preliminary network configuration.

Returning to FIG. 3, at step 308 the preliminary network configuration is optimized to generate an optimized network configuration. In general, this optimization of the preliminary network configuration includes the down selection of a plurality of drone positions and associated communication links. Additionally, this optimization of the preliminary network configuration can include the adjustment of selected drone positions and associated communication links.

Again, in some embodiments a plurality of different possible network configurations are generated from the larger preliminary network configuration, and these plurality of different possible network configurations are evaluated and/or modified during the optimizing process.

The result of this optimization is a selected final plurality of drone positions and associated communication links that are part of an optimized network configuration. Then, at step 310 the optimized network configuration that defines the final plurality of drone positions and associated communication links is transmitted to the drones. The drones can then autonomously travel to the designated drone positions to implement the drone-hosted mesh network as specified.

Figure 6B:
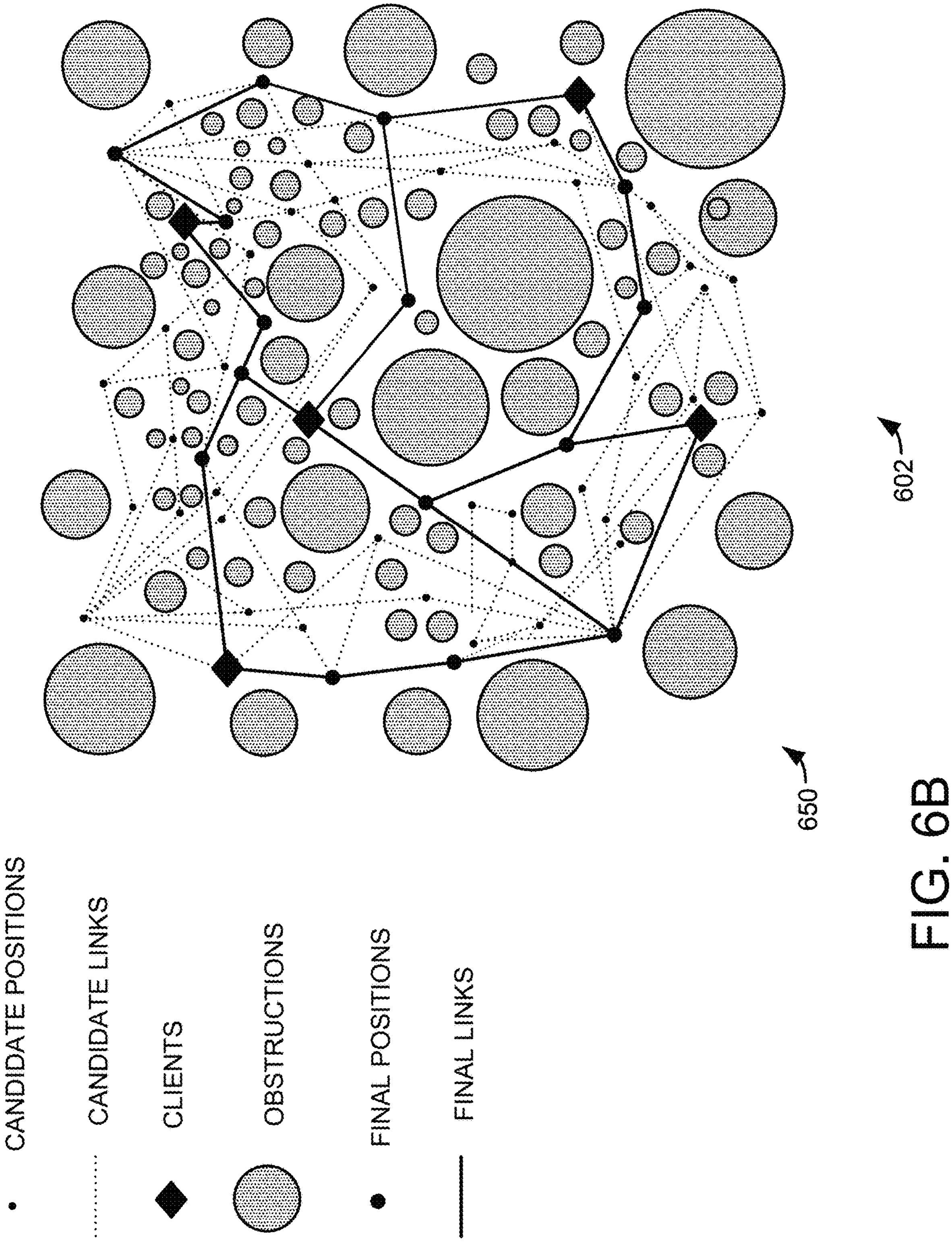

Turning briefly to FIG. 6B, an example of an optimized network configuration 650 is illustrated schematically. The optimized network configuration 650 is an example network configuration after the optimization of step 308. As such, the optimized network configuration 650 defines a plurality of final drone positions and final communication links. This optimized network configuration 650 is again illustrated in the context of a plurality of clients that are interspersed with a plurality of obstructions in a geographic area 602. And again, it should be noted that the optimized network configuration 650 is a relatively simple example, and that real world optimized network configurations could commonly include many more final drone positions and final communication links.

As was stated above, a variety of different techniques can be used in the optimization of step 308. As examples, the optimization can be performed at least in part by generating a link score for each candidate communication link. Stated another way, a link score can be calculated for each communication link in the preliminary network configuration, and that link score used at least in part to determine which preliminary drone positions are included in the optimized network configuration. In these embodiments each link score provides a measure of quality of the communication link and can thus be used to select the best combination of communication links for inclusion into the final optimized network configuration.

In some embodiments the link score can be based at least in part on the distance of the communication link. In such an embodiment communication links having a distance within specified distance ranges can be scored relatively high, with communication links closest to a desired distance scored highest. This desired distance range can be selected to highly score communication links that are relatively close to the maximum distance to encourage spreading of the drones where possible, but not so close as to risk disconnection of the communication link. For example, the link score can be implemented to give links having a distance of about 80% of the maximum range a highest link score, or any other desired agent separation.

As one specific example, a link score can be defined as:

$$\text{link score}(i, j) := \begin{cases} 1 - \dfrac{\left|d(x_i, x_j)^2 - (\alpha \times d_{max})^2\right|}{(\alpha \times d_{max})^2} & \text{if } i \text{ can communicate with } j \\ 0 & \text{else} \end{cases}$$

where $x_i$ is the position of drone i, d denotes Euclidean distance, $d_{max}$ is the max communications range, and $\alpha \in (0, 1]$ controls the fraction of a maximum communications range representing the desired separation between drones. Setting $\alpha=0.8$ in the above formula provides the link score to give links having a distance of about 80% of the maximum range a highest link score discussed above.

In other embodiments, the link score can be based on the robustness of the link when drones are repositioned. In these embodiments communication links that are associated with drones that can move a relatively large distance while maintaining line-of-sight connection are scored highest. Stated another way, the link score can be generated based at least in part on a measure of drone displacement that can occur before a line-of-sight communication path for the communication link becomes obstructed or out of range. In practice, this distance can be significantly less than one derived purely from communications range, especially in obstacle-dense environments.

As one specific technique for generating such a link score, a number of test positions that are a specified distance from the current drone positions are selected. These test positions are then tested for clear line-of-sight and connection link distance. A normalized sum of the test positions that maintain connection of the link based on the line-of-sight evaluation and distance can then be used to determine the link score. So calculated, the link score provides a measure of the robustness of the link when drones are repositioned with the specified distance.

As another example, a link score can be generated based at least in part on a measure of link criticality within the network context. Finally, a combination of such measures can be combined to generate the link scores. In all these embodiments the link scores can then be used in the down selection of candidate drone positions and associated communication links.

In other examples, the optimization can be performed by generating network scores. In these examples the optimization can be performed at least in part by generating a network score for each of a plurality of possible network configurations down selected from the larger, preliminary network configuration. So generated, the network scores can be used at least in part to determine the final optimized network configuration. In these embodiments each network score provides a measure of overall quality of the associated possible network configuration and can thus be used to select the "best" possible network as the final optimized network configuration.

In such examples, the network score of each possible network configuration can be based on a combination of the link scores of the links that make up the possible network configuration. For example, an averaging or weighted averaging of link scores can be used to generate the network scores.

As another example, a network score can be generated for each possible network configuration based at least in part on a measure of spatial coverage for each of the plurality of possible network configurations. As another example, the network score can be generated for each possible network configuration based at least in part on a measure of link redundancy for each of the plurality of possible network configurations. As another example, the network score can be generated for each possible network configuration based at least in part on a measure of node redundancy, where node redundancy provides increased network capacity and resiliency to network interruptions. As another example, the network score can be generated based at least in part on a measure of connectivity for each of the plurality of possible network configurations.

As another example, the network score can be generated based at least in part on a weighted sum of measures of algebraic connectivity for each of the plurality of possible network configurations. In this embodiment, the measures of algebraic connectivity for each of the plurality of possible network configurations can be determined using at least one eigenvalue a Laplacian matrix for each of the plurality of possible network configurations, where the at least one Laplacian matrix is based on a graph model of the corresponding possible network configuration and includes matrix coefficients derived from link scores for corresponding communication links of the plurality of possible communication links.

In such embodiments the Laplacian matrix L(G) can be defined as:

$$L(G) := D - A$$

where G is an adjacency graph for the possible network configuration, with edge weights corresponding to the link scores of the communication links in the network, A is an adjacency matrix for G, and D is a degree graph. When so implemented, the eigenvalues and eigenvectors of the Laplacian L(G) will contain information regarding the connectivity of the network configuration as represented by adjacency graph G. For example, the dimension of the kernel of L(G) will equal the number of connected components of the graph. And if G is connected, the smallest nonzero eigenvalue of G can provide a measure of the algebraic connectivity of the network configuration. And this measure of the algebraic connectivity of the network configuration can be used to generate the network score. For example, the network score can be generated as:

$$\text{network score}(G) := \begin{cases} 2 + a(G) & G \text{ Connected} \\ 1 - \dfrac{n_c}{n_n} + \displaystyle\sum_{i=1}^{n_c} a(G_i)\frac{|G_i|}{(n_a + n_m)} & \text{else} \end{cases}$$

where $n_c$ is the number of connected components, $n_n$ the total number of nodes in the network, $G_i$ the $i^{th}$ connected component, $n_a$ the number of fixed clients, and $n_m$ the number of drone nodes.

In all these embodiments the network scores can then be used in the down selection of candidate drone positions and associated communication links. Thus, the network scores can provide a measure of overall quality of the network and can thus be used to select the "best" network as the final optimized network configuration.

In some embodiments, the optimization of step 308 can be implemented to use a variety of iterative processes. These iterative processes can use the link scores and/or network scores discussed above to iteratively determine the optimized network configuration, and to more specifically determine the drone positions and communication links to include in the optimized network configuration.

Figure 4:
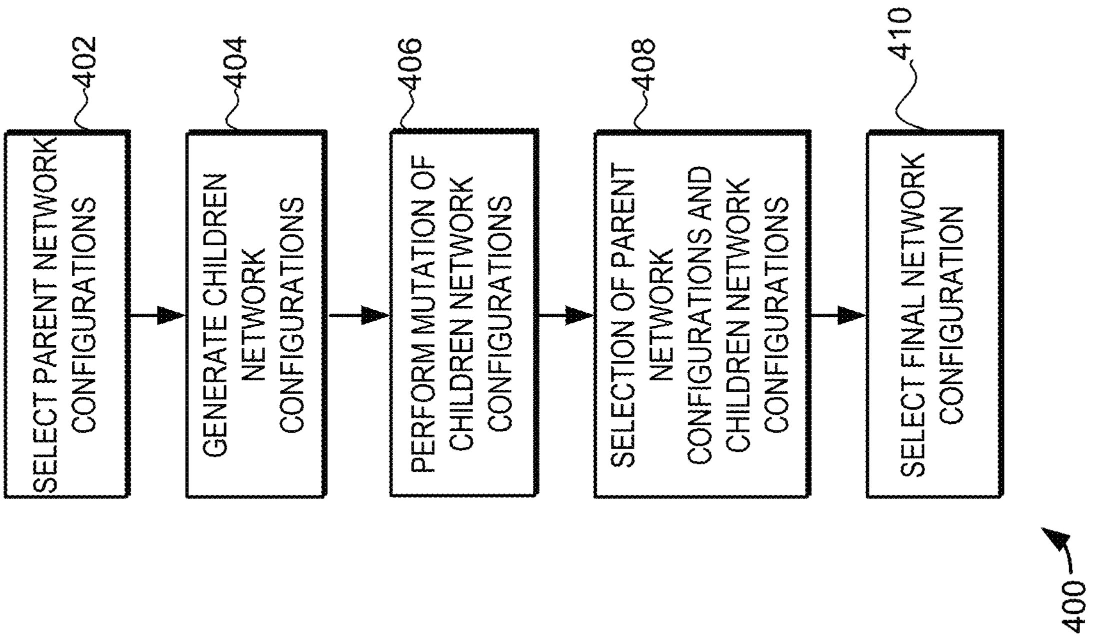
FIG. 4 is a flow diagram illustrating a method of optimizing a drone-hosted mesh network in accordance with various embodiments.

As one specific example, the optimization of step 308 can be iteratively performed using a genetic algorithm. In general, a genetic algorithm can be used to optimize the network configuration using an objective function, where the objective function uses link scores and/or network scores as measure of quality. Turning now to FIG. 4, a method 400 illustrates an exemplary optimization procedure that uses a genetic algorithm and an objective function to generate an optimized network configuration.

At step 402 one or more possible network configurations are selected as "parent" network configurations. As one example, the genetic algorithm uses a tournament selection procedure that repeatedly selects the highest scoring of a randomly selected small subset of possible network configurations from the larger preliminary network configuration generated in steps 302-206 of method 300. These selected possible network configurations are "parent" network configurations for purposes of the genetic algorithm.

At step 404 a plurality of "child" network configurations are generated from the parent network configurations selected in step 402. For example, a crossover operation can then be used to swap and random subset of drone positions between parent network configurations, which each swap resulting in the generation of one or more child network configurations.

At step 406 mutations of the child network configurations are performed. As an example, random "mutations" can be introduced into one or more child network configurations, with each mutation effectively generating an additional child network configuration. As a specific example, one or more Gaussian mutations can be introduced into each child network configuration, where each Gaussian mutation perturbs one or more drone positions in the child network configurations by a small amount. Again, these Gaussian mutations thereby generate additional child network configurations.

At step 408 a subset of the parent and generated child network configurations can be selected. In one embodiment this selection can be performed as a survival selection that probabilistically selects network configurations based in part on an object function. For example, the various network scores described above can be used as all or part of an objective function. In other embodiments the objective function can be based the associated link scores and/or network scores, or combinations of such link scores and/or network scores.

At step 410 a final network configuration is selected from the subset. This final network configuration can be selected based on the objective function, network score, or other such factors.

Figure 5:
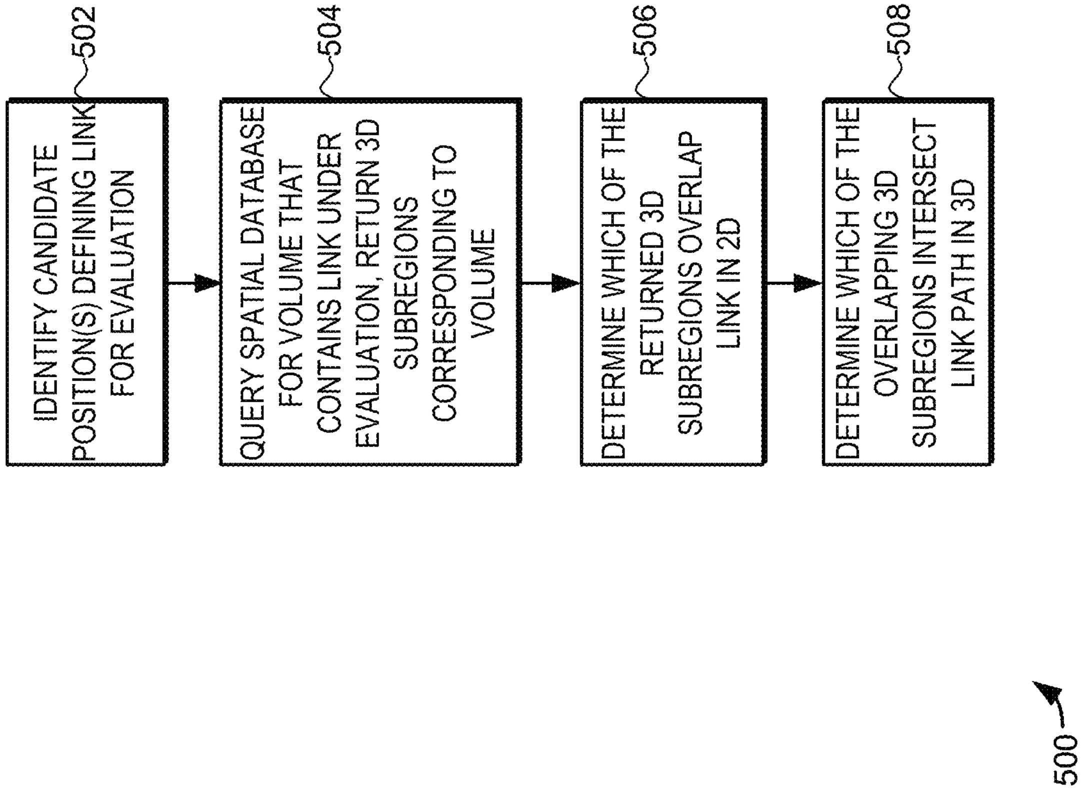
FIG. 5 is a flow diagram illustrating a method of evaluating communication links in accordance with various embodiments.

Turning now to FIG. 5, a method 500 for evaluating communication links for line-of-sight communication is illustrated. In general, the method 500 determines if a communication link is subject to the presence of obstruction(s) in the light-of-sight communication path that would potentially interfere with line-of-sight communication. The method 500 is thus one example of how communication links can be evaluated in step 304 of method 300, as was discussed above. However, the method 500 can also be used to evaluate communication links for other purposes, as discussed above. And as described above, method 500 utilizes a spatial obstruction database that includes obstruction data.

At step 502 a candidate drone position(s) defining a communication link is identified. As was described above with reference to step 302 in method 300, during the formulation of the drone-hosted mesh network the candidate positions can be identified using a directed search.

In other examples, candidate positions can be identified during the optimization of the network configuration. For example, candidate drone positions can be identified during optimization as test positions used in determining a link score, as was described above. As another example, candidate drone positions can be identified when drone positions are perturbed by small amounts as part of a Gaussian mutation during optimization, again as described above. As other examples, candidate drone positions can be identified as part of a network maintenance. For example, candidate drone positions can be identified in evaluating possible new drone positions in response to change in the status of the network. Examples of the identification of candidate drone positions during network maintenance will be discussed below.

In each of these various examples candidate drone position(s) defining a communication link is indicated. At step 504, a spatial obstruction database is queried for a volume that contains the communication link under evaluation, and three-dimensional (3D) subregions corresponding to that volume are returned. In general, step 504 is implemented to return all the subregions from the spatial obstruction database that could possibly intersect with the communication link under evaluation, where the subregions correspond to abstracted obstructions as described above. Stated another way, step 504 can be implemented to return all the 3D subregions corresponding to a volume in the geographic region, where the volume contains the entire communication link under evaluation.

As described above, using the R-tree data structure allows for the representation of obstructions as abstracted 3D subregions, including varying sized cubes and parallelepipeds. The R-tree data structure further allows for the optimization of three-dimensional queries. Thus, implementing the spatial obstruction database with an R-tree data structure facilitates an efficient three dimensional query and return of 3D subregions corresponding to abstracted obstructions that could intersect the communication link under evaluation.

Figure 7A:
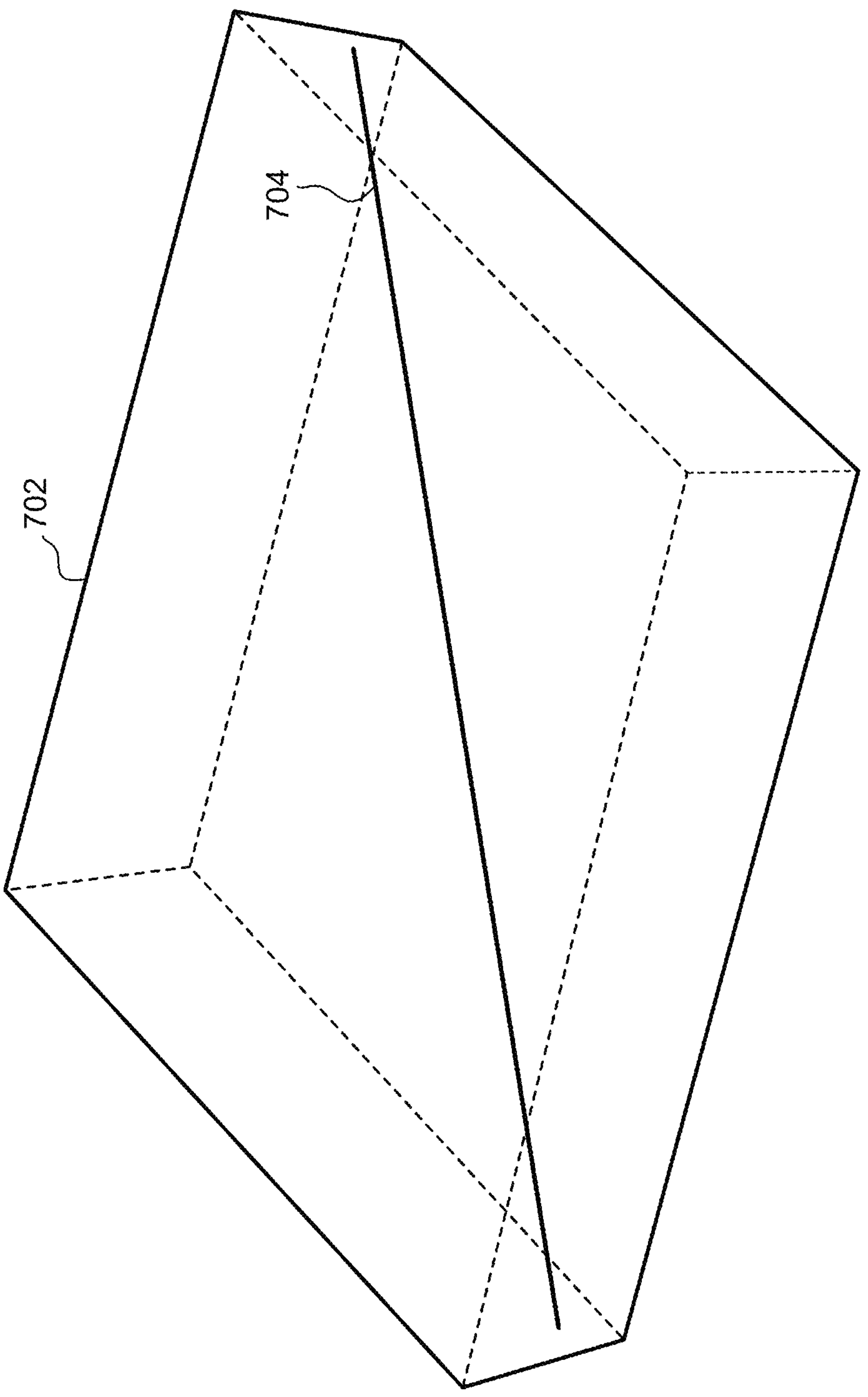
FIGS. 7A and 7B are schematic diagrams of volumes in a spatial obstruction database in accordance with various embodiments.
Figure 7B:
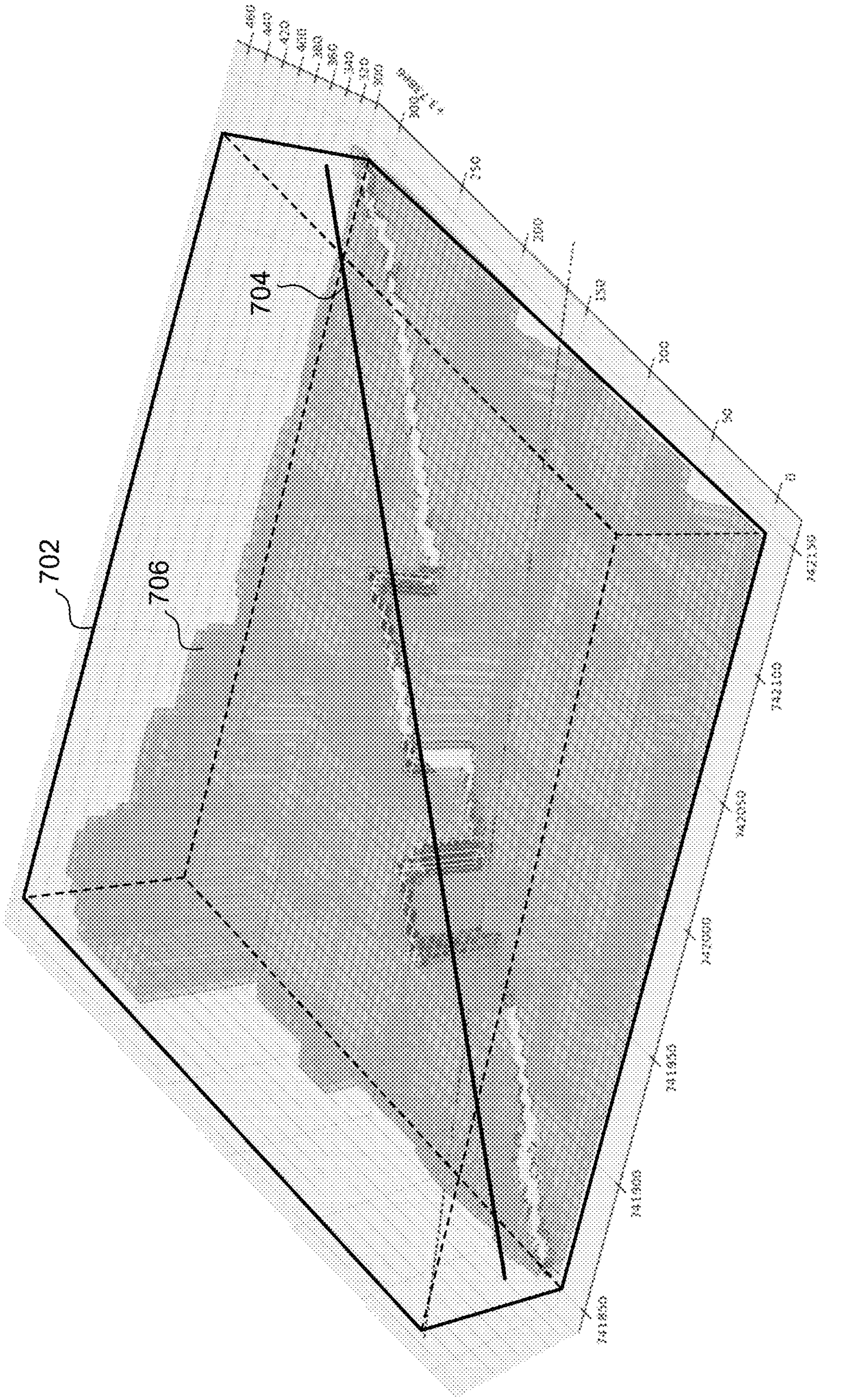

Turning briefly to FIG. 7A, an example volume 702 that contains a communication link 704 is illustrated schematically. As described, in step 504 the three-dimensional (3D) subregions corresponding to that volume are returned. Turning now to FIG. 7B, exemplary returned 3D subregions 706 contained within the volume 702 are illustrated. In this example, each returned 3D subregion is a cuboid, with a height of the cuboid equal to the tallest obstructed point in the 3D subregion, although again this is just one example. These 3D subregions 706 contained within volume 702 represent the abstracted obstructions that could possibly intersect with the communication link 704.

Returning to method 500 in FIG. 5, at step 506 it is determined which returned 3D subregions overlap with the communication link in two dimensions. For example, in step 506 it can be determined which of the 3D subregions returned in step 504 overlap with the communication link in two dimensions that correspond to Easting and Northing axes. As another example, in step 506 it can be determined which returned 3D subregions overlap with the communication link in two dimensions that correspond to latitude and longitude axes.

A variety of different techniques can be used to determine which returned 3D subregions overlap a communication link in two dimensions. For example, a line clipping technique can be used to determine where the communication link crosses the perimeter (e.g., perimeter of the footprint) of returned 3D subregions in two dimensions. Again, the footprint of 3D subregions can be in the form of rectangles or other polygons. Thus, a line clipping technique can be performed by determining the intersection of the communication link with the polygons representing the footprint of the returned 3D subregions. As a specific embodiment, a Liang-Barsky line clipping technique can be used to determine where the communication link crosses the perimeter of returned 3D subregions.

At step 508, it is determined which of the overlapping 3D subregions intersect with the communication link in three dimensions. For example, in step 508 it can be determined which of the 3D subregions that were determined to be overlapping in step 506 intersect with the communication link when the height (or altitude) of the 3D subregions and the height (or altitude) of the overlapping portion of the communication link are considered. Stated another way, the altitudes of the 3D subregions that overlap the communication link in two dimensions with are compared with the attitudes of the overlapping portions of the communication link.

Communication links that are determined to intersect with overlapping 3D subregions are identified as obstructed, and thus in most cases would be discarded and not added to the preliminary network configuration (e.g., during step 306 of method 300) Likewise, such obstructed communication links would be discarded and not added to the network configuration during optimization (e.g., during step 406 of method 400).

Conversely, communication links that are not determined to intersect with overlapping 3D subregions are identified as having a clear line-of-sight path, and thus can be added to the network configuration during formulation or optimization.

Figure 8:
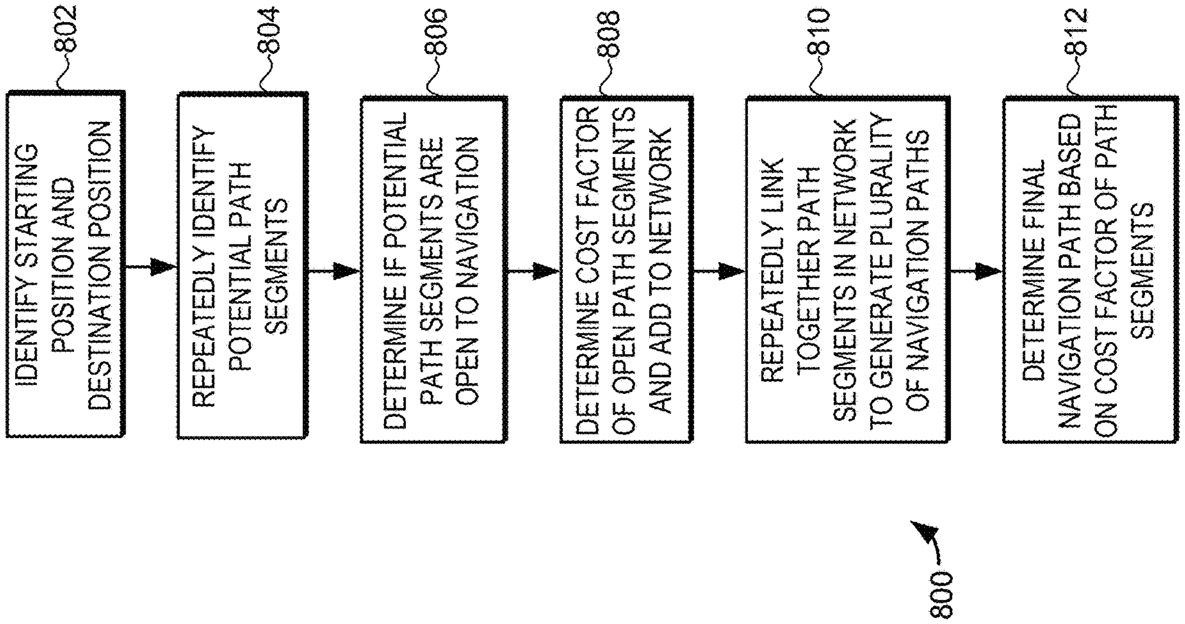
FIG. 8 is a flow diagram illustrating a method of generating a navigation path in accordance with various embodiments.

Turning now to FIG. 8, a method 800 for generating a navigation path is illustrated. As such, the method 800 is an example of a method that can be performed by a mesh network implementation system 250, and more specifically, the navigation path generation module 254 of FIG. 2B. Specifically, the method 800 can be used to generate navigation paths to guide drones to assigned positions in the drone-hosted mesh network. As will be described below, in one embodiment the method 800 utilizes a method 900 (of FIG. 9) for identifying a final navigation path is illustrated.

At step 802 the method 800 identifies a starting position and a destination position for the navigation path. In a typical embodiment step 802 the starting position is identified as a current or known future position of the drone with a geographic area. In the case of the known future position the starting position could correspond to a future assigned drone position in the drone-hosted mesh network, or any other future position of the drone. However, these are just two examples of starting positions, and other starting positions within a geographic can be used.

Likewise, the destination position corresponds to a selected destination for the navigation path. The destination position could thus correspond to any desired destination for the drone. For example, the destination position can correspond to an assigned drone position in the drone-hosted mesh network. In this case the navigation path provides a path from the current location to the assigned drone location. As examples, these drone positions can be expressed as three-dimensional positions in the form of latitude, longitude, altitude (LLA) or Northing value, Easting value, down (NED).

In another example, the destination position could correspond to a test position used in generating a link score for optimization, as was described above. In another example, the destination position could correspond to a new drone position that was selected in response to a change in network status (e.g., as part of network maintenance). In yet another example the destination position can correspond to a base or other facility for added fuel or other maintenance.

In all these cases the starting position and destination positions are identified and used in generating the navigation path. At step 804 potential path segments are repeatedly identified. In general, this step is used to generate a large number of path segments that can be later connected together to generate multiple possible navigation paths between the starting position and destination position.

In one embodiment potential path segments are identified using a random tree selection of candidate points in the geographic area, where the candidate points define potential path segments. In some embodiment this random tree exploration is directed to perform the selection of candidate points in areas around and between the starting position and the destination position. Notably, this can include a selection of candidate points that may result in the navigation path heading in the wrong direction. However, these candidate points are included as it may be desirable for the navigation path to travel around obstructions by moving away from the destination at times. Directing the exploration toward these areas can thus improve the efficiency of the exploration and the identification of candidate points that correspond to potential path segments.

In some embodiments the candidate points and potential path segments can be selected utilizing a random tree selection of points in the geographic region proximate the starting position, points proximate the destination position, and points between the starting position and ending position.

In sone specific embodiment, step 804 is implemented to use a variation of a Rapidly-Exploring Random Tree (RRT) exploration technique. For example, step 804 can be implemented to use a continuous RRT* exploration technique. In general, a continuous RRT* exploration technique is graph traversal and pathfinding technique (i.e., a variant of A*) that uses randomized trees to identify candidate points that can be used to create valid pathways. In the continuous RRT* exploration technique randomized points within the geographic area can be thus be selected and used to repeatedly identify potential path segments.

At step 806 the potential path segments are evaluated to determine if they are open to navigation. Specifically, step 806 determines if a potential path segment defined by the candidate points has an open line-of-sight path to allow for drone travel. Specific exemplary techniques for evaluating path segments for open line-of-sight travel will be discussed below with reference to method 1000 and FIG. 10.

At step 808 a cost factor is determined for potential path segments that were determined to be open for line-of-sight travel, and the open potential path segments are added to a preliminary navigation path network. Potential path segments that are determined to not have an open line-of-sight travel path are not added to the preliminary navigation path network.

In general, the cost factor describes the quality of path segment for drone navigation in a way that allows for the evaluation of path segments and the optimized selection of path segments for use in a navigation path. Stated another way, the cost factor can be implemented to quantify the quality of the path segment in providing a portion of a path to the destination point. As such, a variety of different metrics can be included in such cost factors, including distance. Likewise, a variety of different techniques can be used to determine such cost factor for potential path segments.

As one specific example, cost factors can be calculated as sums of Euclidean squared distances augmented by weighting factors. For example, the cost factors can be augmented by weighting factors based safety hazards, regulatory hazards, human caused hazards, available power, etc. With such cost factors are calculated for each potential path segment, a heuristic evaluation of the cost for potential path segments in the navigation path can be performed.

Figure 11A:
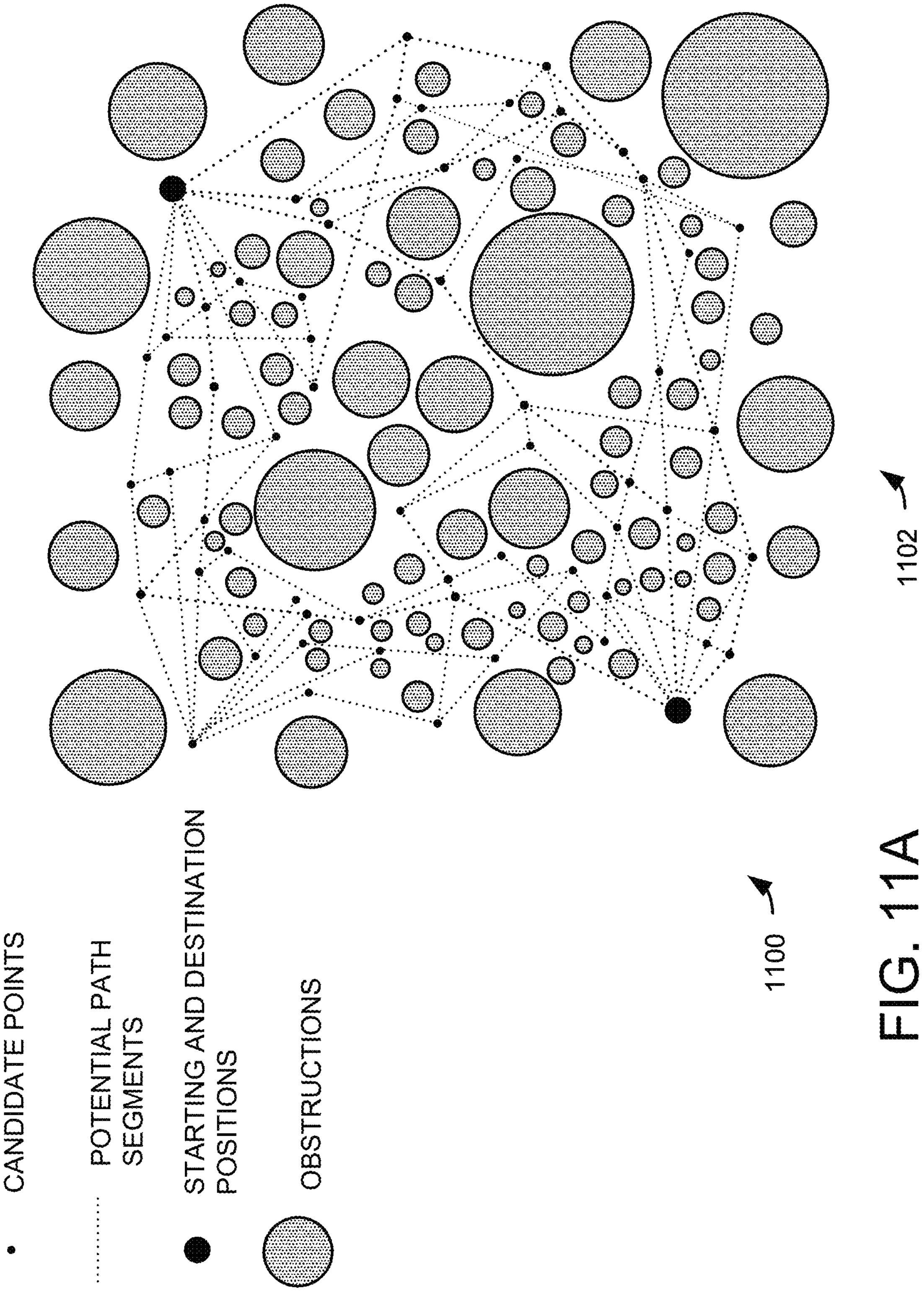
FIGS. 11A, 11B, 11C and 11D are schematic diagrams of generation of a navigation path in accordance with various embodiments.

Turning briefly to FIG. 11A, an example of a preliminary navigation path network 1100 is illustrated schematically. The preliminary navigation path network 1100 is an example preliminary path network that can be generated using steps 802-808 as described above. As such, the preliminary navigation path network 1100 defines a plurality of candidate points and associated potential path segments. This preliminary navigation path network 1100 is illustrated in the context of starting and destination points and a plurality of obstructions in a geographic area 1102. It should be noted that the preliminary navigation path network 1100 is a relatively simple example, and that real world preliminary navigation path network could commonly include thousands of candidate points and potential path segments.

Returning to FIG. 8, at step 810 the potential path segments in the preliminary navigation path network are repeatedly linked together to generate a plurality of navigation paths. In general, this step comprises selecting path segments and linking them together to generate a plurality of navigation paths from the starting position to the destination position. And in some embodiments the cost factor of the segments can be used in the generating of the plurality of navigation paths. As one example, this step can be performed by using a selection method that favors lower cost path segments and disfavors high cost segments.

Figure 11B:
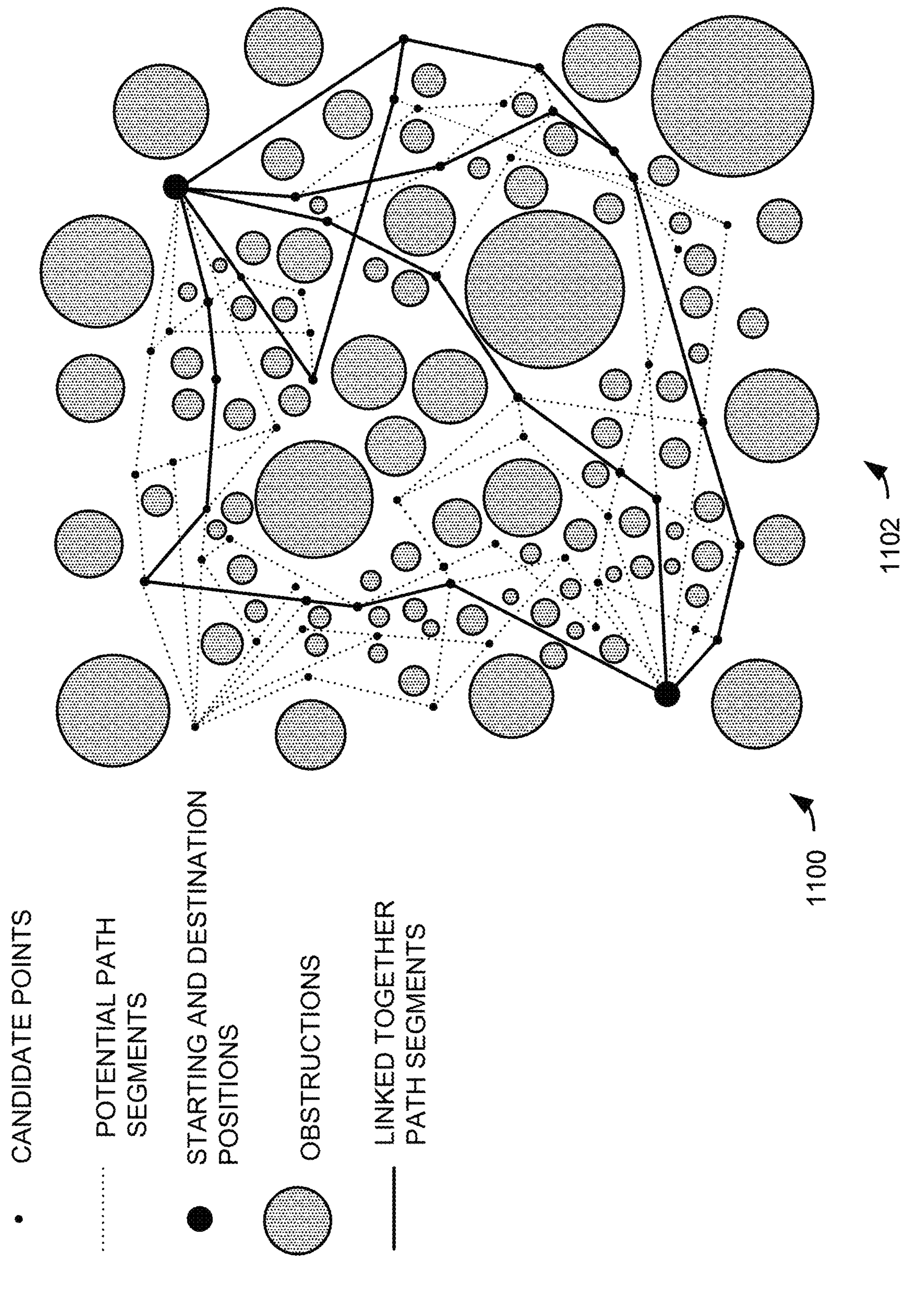

Turning briefly to FIG. 11B, an example of potential path segments in the preliminary navigation path network 1100 being linked to together to generate a plurality of navigation paths is illustrated schematically.

Returning to FIG. 8, at step 812 a final navigation path is determined from the plurality of navigation paths based at least in part on the cost factor of the potential path segments. In general, this step selects the final navigation path from the plurality of previously generated navigation paths in a way that that reduces or optimizes the cost of the final navigation path. As one specific example, a Dijkstra reduction of plurality of navigation paths can be used to generate the final navigation path from the previously generated plurality of navigation paths. Using the Dijkstra reduction results in the selection of an optimized, reduce cost path from the starting position to the destination. Specifically, Dijkstra reduction can find the shortest path through the collection of path segments produced by multiple executions of the RRT* path generation.

In another specific example of step 812, a final navigation path can be determined in part by identifying intersections in potential path segments and dividing the path segments at the identified intersections to introduce more candidate points in the plurality of navigation paths.

Figure 9:
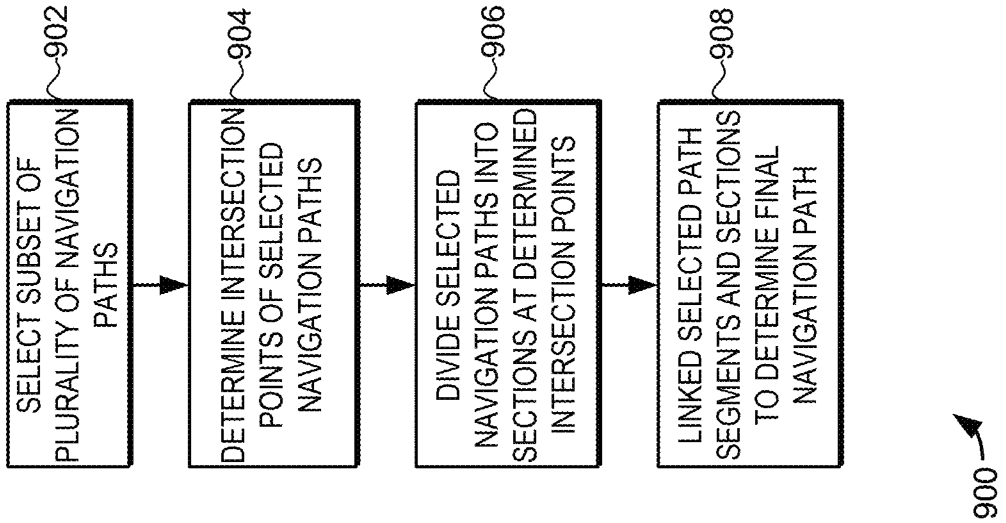
FIG. 9 is a flow diagram illustrating a method of determining a final navigation path in accordance with various embodiments.

Turning now to FIG. 9, a method 900 for identifying a final navigation path is illustrated. As such, the method 900 is one example of how step 812 in method 800 can be implemented. In general, method 900 determines a final navigation path by identifying intersections in potential path segments and dividing the path segments at the identified intersections to introduce more candidate points in the plurality of navigation paths.

At step 902 a subset of navigation paths from the starting position to the destination position can be selected. This selection of navigation paths can be performed based on a variety of factors. For example, this selection can be performed based in part on the cost factors of the associated path segments in the navigation paths as discussed above.

At step 904 intersection points of segments in selected navigation paths are determined. At step 906 the segments of the selected navigation paths are divided at the determined intersection points.

Figure 11C:
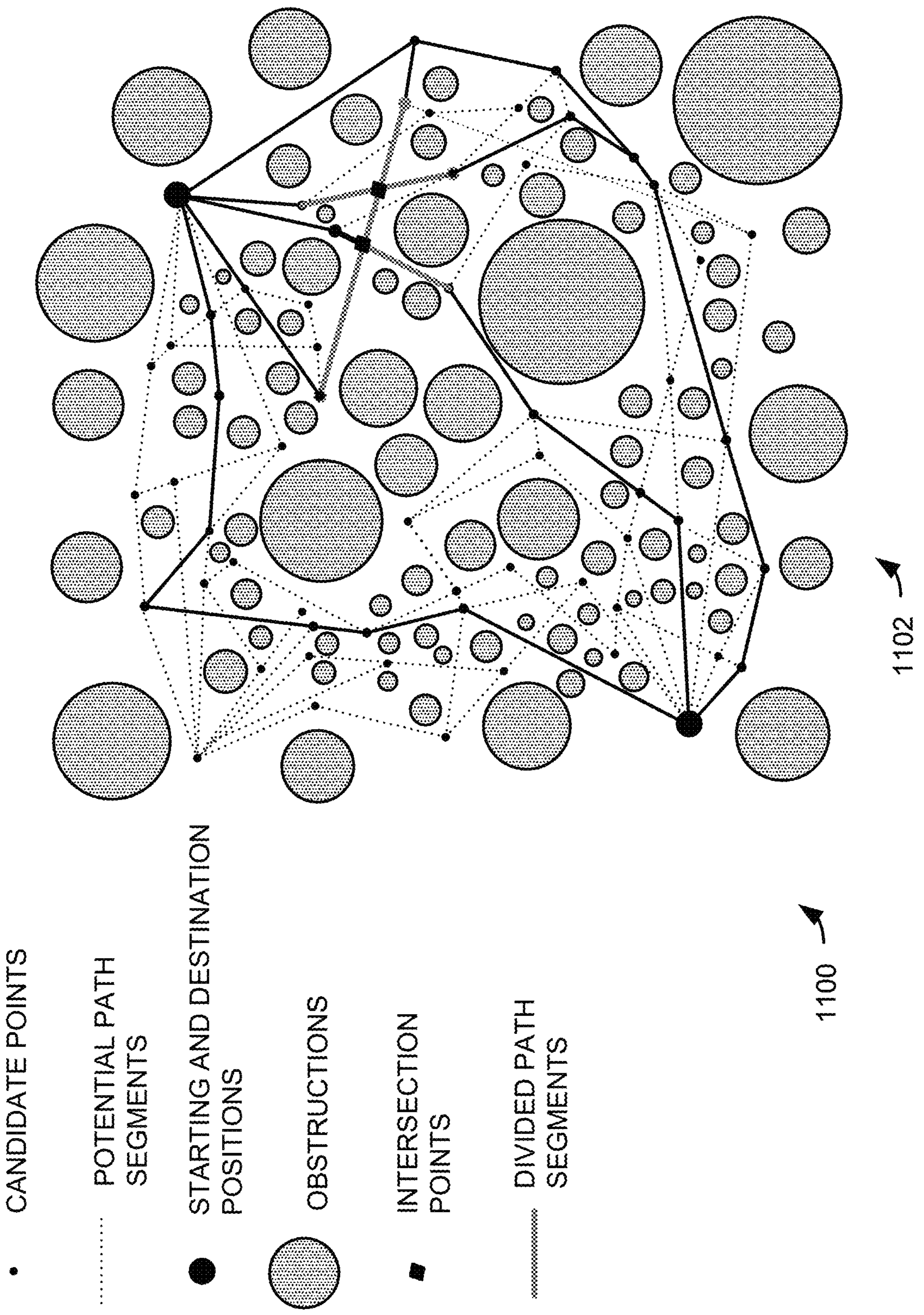

Turning briefly to FIG. 11C, an example of a determination of the intersection of the potential path segments in a subset of selected navigation paths is illustrated. Additionally, the dividing the intersected navigation path segments into sections is illustrated. Specifically, FIG. 11C illustrates an example where three path segments of selected navigation paths intersect at two different intersection points. And in this illustrated example the three path segments can be divided into seven sections using these intersection points as dividing points.

Returning to method 900, at step 908 a final navigation path is determined by linking selected path segments and/or sections. A variety of techniques can be used in the linking of selected path segments and sections into a final navigation path. For example, a cost factor of the newly identified sections (i.e., the sections resulting from the dividing of segments at intersection points in step 906) can be calculated and used along with the cost factors of the undivided path segments in the selection of segments and/or sections for the final navigation path.

Thus, in this method a cost factor can be determined for each new section of path segment is created by the dividing segments at intersection points, and those cost factors of new sections used along with the cost factors of undivided path segments in selecting and linking of the sections and segments into the final navigation path.

For example, the subset of the navigation paths from the starting position to the destination position can be selected based at least in part on the cost factor of the potential path segments in the navigation paths. The intersection points of the selected subset of the navigation paths can then be determined, and the selected subset of the navigation paths divided into sections at the determined intersection points. A cost factor can then be calculated for each of these new sections resulting from the division. Finally, a final navigation path can be determined by selecting and linking the sections based on the cost factor.

Figure 11D:
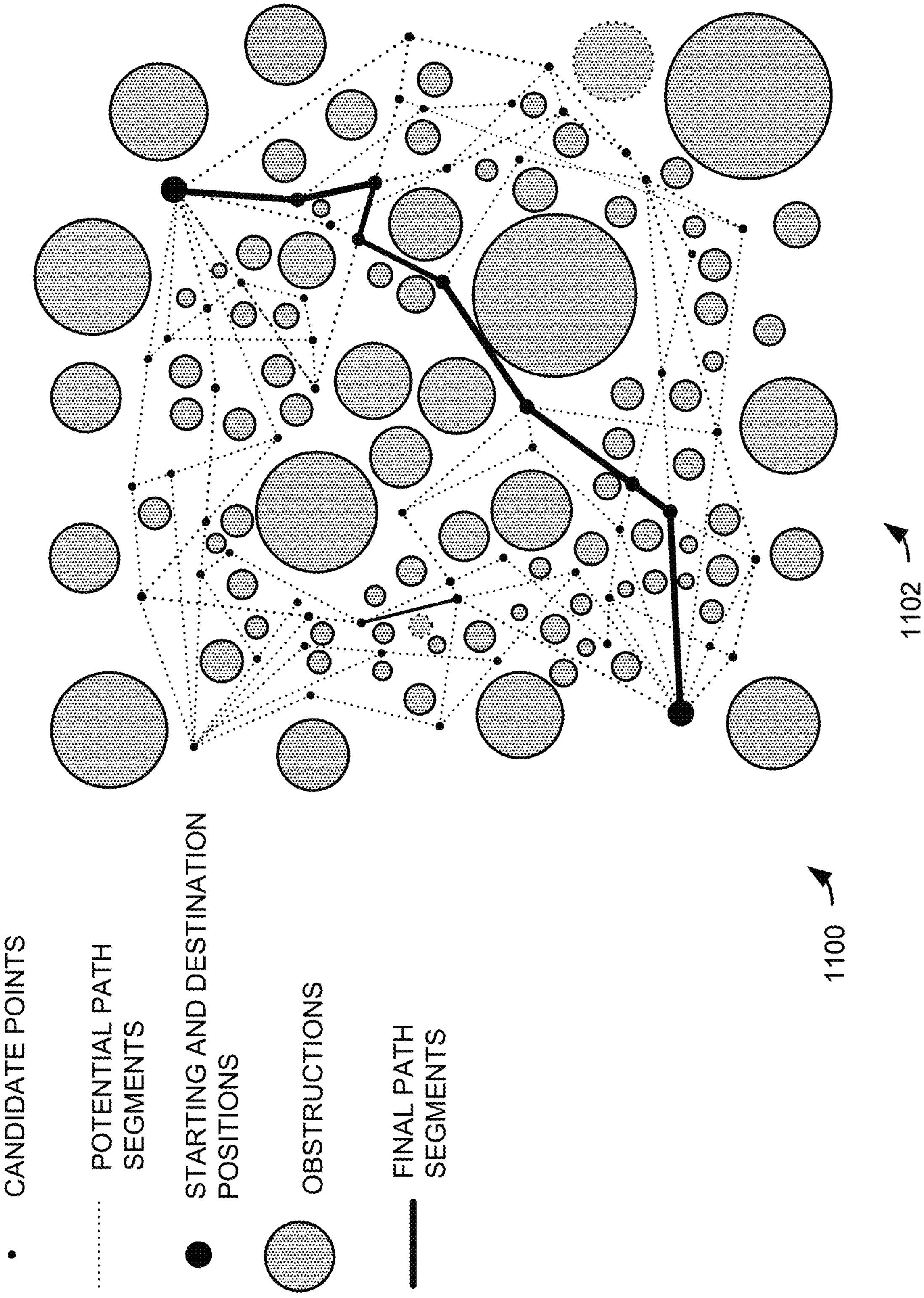

Turning next to FIG. 11D, an example of a final navigation path created by selecting and linking the sections and path segments is illustrated. So generated, the final navigation path provides for the generation and selection of a valid and efficient drone path.

Figure 10:
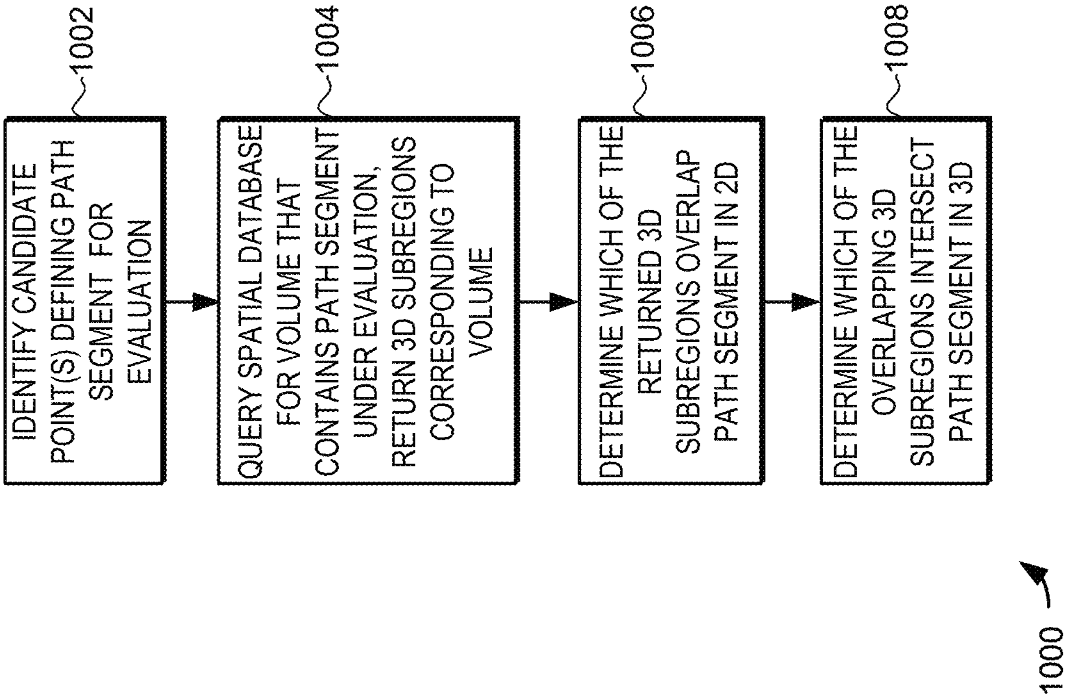
FIG. 10 is a flow diagram illustrating a method of evaluating path segments in accordance with various embodiments.

Turning now to FIG. 10, a method 1000 for evaluating path segments is illustrated. As such, the method 1000 is an example of a method that can be performed by a mesh network implementation system 250, and more specifically, the path segment evaluation module 256 of FIG. 2B. Specifically, the method 1000 can be used to evaluate path segments for clear line-of-sight travel paths.

In general, the method 1000 determines if a path segment is subject to the presence of obstruction(s) in the light-of-sight travel path that would potentially interfere with line-of-sight travel. The method 1000 is thus one example of how path segments can be determined to be open to navigation in step 806 of FIG. 8, as was discussed above. And method 1000 utilizes a spatial obstruction database that includes obstruction data. However, in this case it should be noted that the obstruction data can include both data on structures and features (e.g., buildings, terrain, electromagnetic or other interference) and data on restricted areas (e.g., areas with restricted airspace or other no-go areas where the drone should not fly).

At step 1002 candidate point(s) defining a path segment are identified. As was described above with reference to steps 802 and 804 in method 800, a variety of techniques can be used to identify candidate points for a navigation path. For example, these points may be identified in step 804 using a random tree selection of points in the geographic region.

At step 1004, a spatial obstruction database is queried for a volume that contains the path segment under evaluation, and three-dimensional (3D) subregions corresponding to that volume are returned. In general, step 1004 is implemented to return all the subregions from the spatial obstruction database that could possibly intersect with the path segment under evaluation, where the subregions correspond to abstracted obstructions as described above. Stated another way, step 1004 can be implemented to return all the 3D subregions corresponding to a volume in the geographic region, where the volume contains the entire path segment under evaluation.

As described above, using an R-tree data structure in the spatial obstruction database allows for the representation of obstructions as abstracted 3D subregions, including varying sized cubes and parallelepipeds. The R-tree data structure further allows for the optimization of three-dimensional queries. Thus, implementing the spatial obstruction database with an R-tree data structure facilitates an efficient three dimensional query and return of 3D subregions corresponding to abstracted obstructions that could intersect the path segment under evaluation.

Figure 12A:
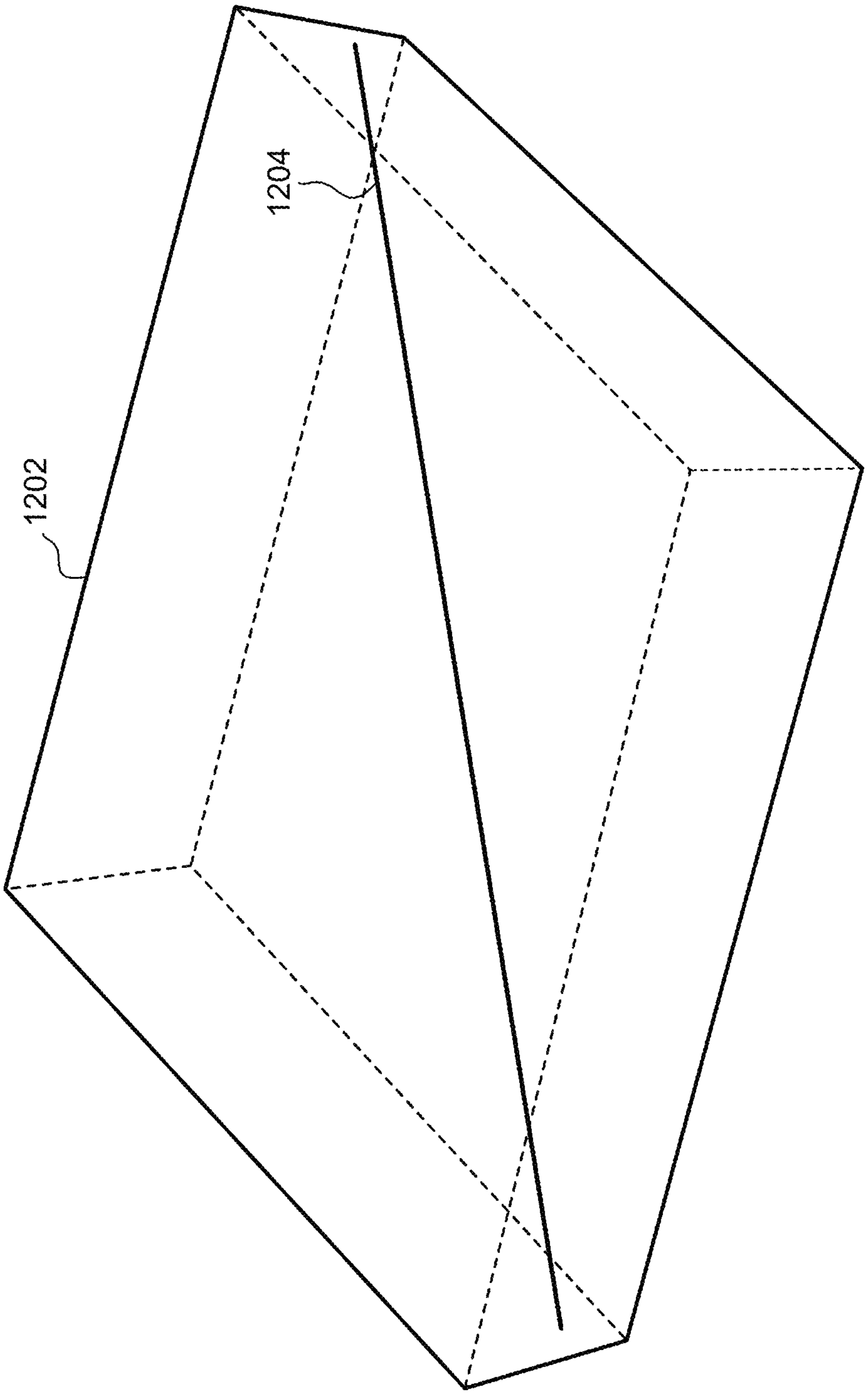
FIGS. 12A and 12B are schematic diagrams of volumes in a spatial obstruction database in accordance with various embodiments.
Figure 12B:
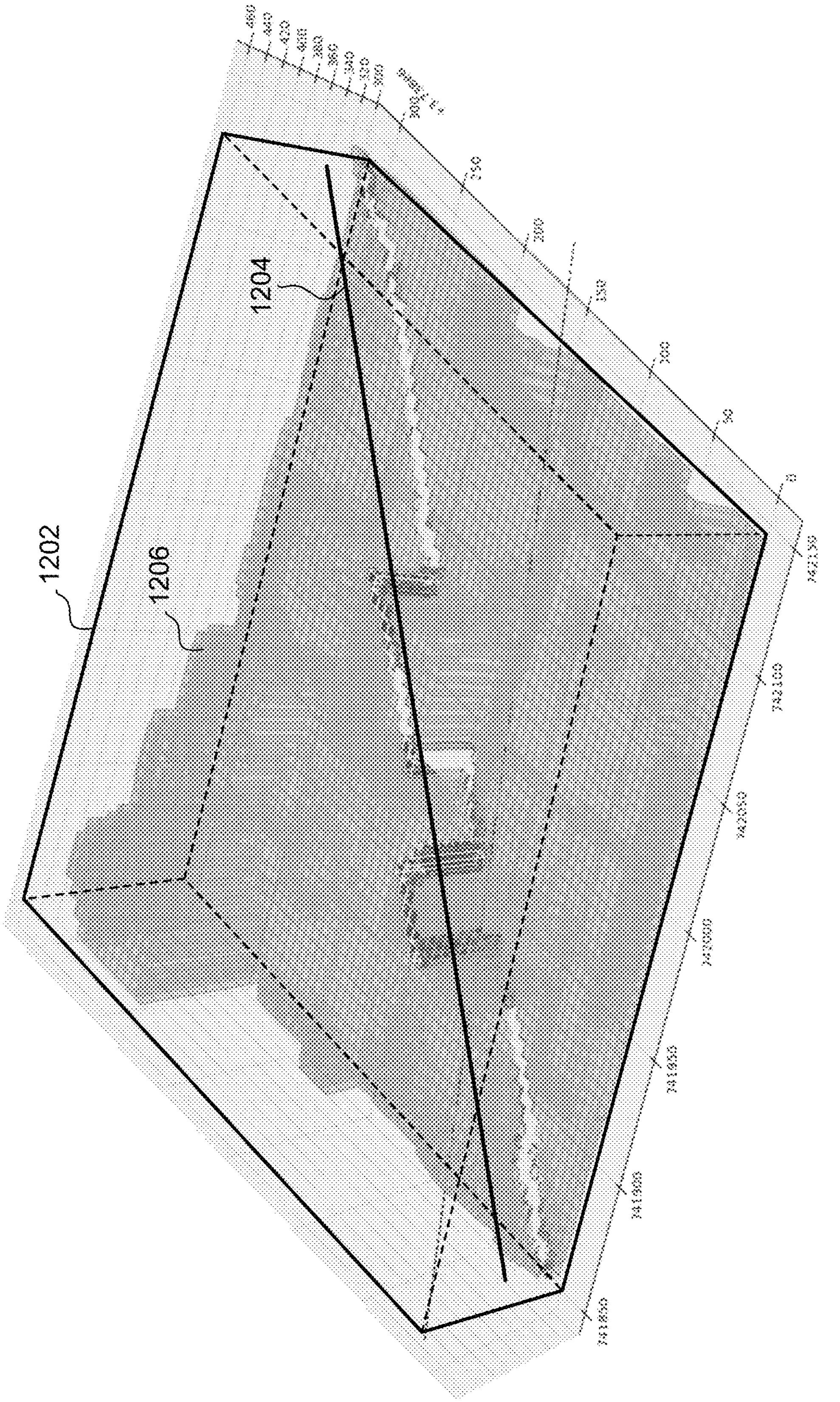

Turning briefly to FIG. 12A, an example volume 1202 that contains a path segment 1204 is illustrated schematically. As described, in step 1004 the three-dimensional (3D) subregions corresponding to that volume are returned. Turning now to FIG. 12B, exemplary returned 3D subregions 1206 contained within the volume 1202 are illustrated. In this example, each returned 3D subregion is a cuboid, with a height of the cuboid equal to the tallest obstructed point in the 3D subregion, although again this is just one example. These 3D subregions 706 contained within volume 1202 represent the abstracted obstructions that could possibly intersect with the path segment 1204.

Returning to method 1000 in FIG. 10, at step 1006 it is determined which returned 3D subregions overlap with the path segment in two dimensions. For example, in step 1006 it can be determined which of the 3D subregions returned in step 1004 overlap with the path segment in two dimensions that correspond to Easting and Northing axes. As another example, in step 1006 it can be determined which returned 3D subregions overlap with the path segment in two dimensions that correspond to latitude and longitude axes.

A variety of different techniques can be used to determine which returned 3D subregions overlap a path segment in two dimensions. For example, a line clipping technique can be used to determine where the path segment crosses the perimeter (e.g., perimeter of the footprint) of returned 3D subregions in two dimensions. Again, the footprint of 3D subregions can be in the form of rectangles or other polygons. Thus, a line clipping technique can be performed by determining the intersection of the path segment with the polygons representing the footprint of the returned 3D subregions. As a specific embodiment, a Liang-Barsky line clipping technique can be used to determine where the path segment crosses the perimeter of returned 3D subregions.

At step 1008, it is determined which of the overlapping 3D subregions intersect with the path segment in three dimensions. For example, in step 1008 it can be determined which of the 3D subregions that were determined to be overlapping in step 1006 intersect with the path segment when the height (or altitude) of the 3D subregions and the height (or altitude) of the overlapping portion of the path segment are considered. Stated another way, the altitudes of the 3D subregions that overlap the path segment in two dimensions with are compared with the attitudes of the overlapping portions of the path segment.

Path segments that are determined to intersect with overlapping 3D subregions are identified as obstructed, and thus in most cases would be discarded and not added to the navigation path network (e.g., during step 808 of method 800)

Conversely, path segments that are not determined to intersect with overlapping 3D subregions are identified as having a clear line-of-sight path, and thus can be added to the navigation path network during generation of the navigation path.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system comprising:
- a spatial obstruction database for a geographic region, where the spatial obstruction database represents physical features in the geographic region as abstracted spatial obstructions within the spatial obstruction database;
- at least one processor configured to:
  - identify a potential path in the geographic region, where the potential path is defined between a plurality of positions within the geographic region, and for the potential path:
    - query the spatial obstruction database for a volume that contains the potential path and return abstracted spatial obstructions from the spatial obstruction database that correspond to the volume;
    - determine if any of the returned abstracted spatial obstructions for the volume intersect with the potential path to determine if the potential path is unobstructed;
    - selectively operate a drone using the potential path based at least in part on the determination of whether the potential path is unobstructed.

2. The system of claim 1, wherein the spatial obstruction database is optimized for three-dimensional queries.

3. The system of claim 1, wherein the spatial obstruction database represents the abstracted spatial obstructions as subregions having a defined footprint and defined height.

4. The system of claim 1, wherein the spatial obstruction database represents the abstracted spatial obstructions as subregions having a parallelepiped shape.

5. The system of claim 1, wherein the spatial obstruction database represents the physical features in the geographic region as the abstracted spatial obstructions within the spatial obstruction database by being configured to:
- represent the geographic region as a plurality of subregions; and
- for each of the plurality of subregions that includes an obstruction, identify at least an obstructed high point and identifying the subregion as fully obstructed to the obstructed high point.

6. The system of claim 1, wherein the at least one processor is configured to determine if any of the returned spatial obstructions for the volume intersect with the potential path by being configured to:
- determine which of the returned abstracted spatial obstructions overlap the potential path in two dimensions; and
- determine if any of the returned abstracted spatial obstructions that overlap the potential path in two dimensions overlap with the potential path in a third dimension.

7. The system of claim 6, wherein the at least one processor is configured to determine which of the returned abstracted spatial obstructions overlap the potential path in the two dimensions by being configured to line clip the potential path relative to each of the returned abstracted spatial obstructions.

8. The system of claim 7, wherein the at least one processor is configured to determine if any of the returned abstracted spatial obstructions that overlap the potential path in the two dimensions overlap with the potential path in the third dimension by being configured to compare altitudes of each of the returned abstracted spatial obstructions that overlap the potential path in the two dimensions with attitudes of overlapping portions of the potential path.

9. The system of claim 1, wherein the potential path is a potential navigation path for the drone in a fleet of drones, and wherein the at least one processor is configured to selectively operate the drone using the potential path based at least in part on the determination of whether the potential path is unobstructed by selectively navigating the drone along the potential path based at least in part on the determination of whether the potential path is unobstructed.

10. The system of claim 1, wherein the potential path is a candidate communication link between the drones, and wherein the at least one processor is configured to selectively operate the drones using the potential path based at least in part on the determination of whether the potential path is unobstructed by selectively establishing a communication link between the drones along the potential path based at least in part on the determination of whether the potential path is unobstructed.

11. A method for evaluating a potential path, comprising:
- providing a spatial obstruction database for a geographic region, where the spatial obstruction database represents physical features in the geographic region as abstracted spatial obstructions within the spatial obstruction database; and
- identifying the potential path in a geographic region, where the potential path is defined between a plurality of positions within a geographic region, and for the potential path:

querying the spatial obstruction database for a volume that contains the potential path and return abstracted spatial obstructions from the spatial obstruction database that correspond to the volume;

determining if any of the returned abstracted spatial obstructions for the volume intersect with the potential path to determine if the potential path is unobstructed;

selectively operating a drone using the potential path based at least in part on the determination of whether the potential path is unobstructed.

12. The method of claim 11, wherein the spatial obstruction database is optimized for three-dimensional queries.

13. The method of claim 11, wherein the spatial obstruction database represents the abstracted spatial obstructions as subregions having a defined footprint and defined height.

14. The method of claim 11, wherein the spatial obstruction database represents the abstracted spatial obstructions as subregions having a parallelepiped shape.

15. The method of claim 11, wherein the spatial obstruction database represents the physical features in the geographic region as the abstracted spatial obstructions within the spatial obstruction database by being configured to:

represent the geographic region as a plurality of subregions; and for each of the plurality of subregions that includes an obstruction, identify at least an obstructed high point and identifying the subregion as fully obstructed to the obstructed high point.

16. The method of claim 11, wherein the determining if any of the returned spatial obstructions for the volume intersect with the potential path is performed at least in part by:

determining which of the returned abstracted spatial obstructions overlap the potential path in two dimensions; and determining if any of the returned abstracted spatial obstructions that overlap the potential path in two dimensions overlap with the potential path in a third dimension.

17. The method of claim 11, wherein the determining which of the returned spatial obstructions overlap the potential path in the two dimensions is performed at least in part by line clipping the potential path relative to each of the returned abstracted spatial obstructions.

18. The method of claim 17, wherein the determining if any of the returned spatial obstructions that overlap the potential path in the two dimensions overlap with the potential path in the third dimension is performed at least in part by comparing altitudes of each of the returned abstracted spatial obstructions that overlap the potential path in the two dimensions with attitudes of overlapping portions of the potential path.

19. The method of claim 11 wherein the potential path is a potential navigation path for the drone in a fleet of drones, and wherein the selectively operating the drone using the potential path based at least in part on the determination of whether the potential path is unobstructed is performed by selectively navigating the drone along the potential path based at least in part on the determination of whether the potential path is unobstructed.

20. The method of claim 11, wherein the potential path is a candidate communication link between the drones in a plurality of drones, and wherein the selectively operating the drone using the potential path based at least in part on the determination of whether the potential path is unobstructed is performed by selectively establishing a communication link between the drones along the potential path based at least in part on the determination of whether the potential path is unobstructed.

* * * * *